US011514072B1

(12) United States Patent
Kelly

(10) Patent No.: US 11,514,072 B1
(45) Date of Patent: Nov. 29, 2022

(54) COMPUTERIZED SYSTEM FOR PROGRAMMATIC MAPPING OF RECORD LINEAGE BASED ON DATA FLOW THROUGH DATA STORAGE COMPONENTS

(71) Applicant: Cigna Intellectual Property, Inc., Wilmington, DE (US)

(72) Inventor: John M. Kelly, Canton, CT (US)

(73) Assignee: Cigna Intellectual Property, Inc., Wilmington, DE (US)

( * ) Notice: Subject to any disclaimer, the term of this patent is extended or adjusted under 35 U.S.C. 154(b) by 169 days.

(21) Appl. No.: 16/731,427

(22) Filed: Dec. 31, 2019

(51) Int. Cl.
*G06F 16/26* (2019.01)
*G06F 16/25* (2019.01)
*G06F 16/23* (2019.01)
*G06F 16/21* (2019.01)

(52) U.S. Cl.
CPC ............ *G06F 16/26* (2019.01); *G06F 16/211* (2019.01); *G06F 16/2386* (2019.01); *G06F 16/258* (2019.01)

(58) Field of Classification Search
CPC .... G06F 16/26; G06F 16/2386; G06F 16/211; G06F 16/258; G06F 16/1794
See application file for complete search history.

(56) References Cited

U.S. PATENT DOCUMENTS

| | | | |
|---|---|---|---|
| 8,229,775 B2 | 7/2012 | Adler | |
| 8,276,585 B2 | 10/2012 | Buckley | |
| 8,595,042 B2 | 11/2013 | Adler | |
| 8,786,597 B2 | 7/2014 | Doganata | |
| 8,825,695 B2 | 9/2014 | Studer | |
| 9,348,879 B2 | 5/2016 | Mohammad | |
| 10,331,660 B1* | 6/2019 | Chapin | ................. G06F 16/258 |
| 2013/0346426 A1* | 12/2013 | O'Byrne | ............... G06F 16/219 |
| | | | 707/754 |
| 2015/0026117 A1 | 1/2015 | Wan | |
| 2015/0356094 A1* | 12/2015 | Gorelik | ................. G06F 16/211 |
| | | | 707/748 |
| 2019/0220458 A1 | 7/2019 | Chapin | |
| 2019/0361795 A1 | 11/2019 | Cole | |
| 2020/0265075 A1 | 8/2020 | Knapp | |
| 2020/0334277 A1* | 10/2020 | Doyle | ................... G06F 16/245 |

* cited by examiner

*Primary Examiner* — William B Partridge
*Assistant Examiner* — Erich Alexander Fischer
(74) *Attorney, Agent, or Firm* — Miller Johnson

(57) ABSTRACT

An apparatus includes processing circuitry and a memory storing instructions that, when executed by the processing circuitry, cause the apparatus to identify a plurality of components and a data flow that interconnects the plurality of components. The instructions cause the apparatus to determine a lineage of a record generated by the plurality of components based on the data flow. The lineage indicates the data flow from a first component to a second component of the plurality of components to generate the record. The instructions cause the apparatus to present, to a user, a visual depiction of the lineage of the record. The visual depiction indicates the data flow of a query through at least the first component and the second component of the plurality of the components to generate the record.

31 Claims, 13 Drawing Sheets

US 11,514,072 B1

COMPUTERIZED SYSTEM FOR PROGRAMMATIC MAPPING OF RECORD LINEAGE BASED ON DATA FLOW THROUGH DATA STORAGE COMPONENTS

FIELD

The present disclosure relates to the field of distributed data storage and schematic presentation, and more particularly to the field of distributed data involving a set of components, such as a set of servers connected by one or more networks, between which data objects are transferred.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In the field of computing, many scenarios involve a distribution of data over a set of components, such as a set of servers that are connected by one or more networks. As a first example, a cluster of servers may be arranged to store a distributed database, where each server of the cluster stores a subset of the database, such as a subset of the tables of the database and/or a subset of the records of a table of the database.

As a second example, servers that are provided for different roles may be aggregated into a data source. For instance, a first server may receive a query, may retrieve a first data set that is stored by the first server and responsive to the query, and may provide the first data set to a second server. The second server may receive the query and the first data set, may generate a second data set by altering the first data set and/or add some data that is stored by the second server and responsive to the query, and may provide the second data set to a third server. In this manner, a set of servers may interoperate to fulfill the query according to a data flow—that is, the stepwise transfer of data among a set of servers.

In such scenarios, the logical contents of the interoperating components may be considered together as, for example, a logical schema. That is, the data that is stored and/or provided by each of the components may be considered together as a unified set of resources. Queries may be developed based on the logical organization of the resources—for example, by retrieving a data set from a first table, joining the data set with additional data from a second table, and filtering the data set based on data in a third table. The query may be executed in the manner specified according to the logical schema and irrespective of the physical organization of the resources. For example, all three tables may be stored by a first component; or the first and second tables may be stored by a first component while the third table is stored by a second component; or one of the tables may be distributed over two or more components that operate in tandem to process the query.

The formulation of the query according to the logical schema of the resources provides a level of abstraction over the physical organization of the resources. Because of such abstraction, queries may be executed over the logical collection of components even if the organization of the resources changes. For example, a table may be relocated from a first component to a second component, or a table that is initially stored by a first component may be refactored to be distributed over the first component and a second component. A query that is specified according to the logical schema may exhibit a different data flow as the logical organization changes, but may nevertheless be processed according to the logical schema.

SUMMARY

An apparatus includes processing circuitry and a memory storing instructions that, when executed by the processing circuitry, cause the apparatus to identify a plurality of components and a data flow that interconnects the plurality of components. The instructions cause the apparatus to determine a lineage of a record generated by the plurality of components based on the data flow. The lineage indicates the data flow from a first component to a second component of the plurality of components to generate the record. The instructions cause the apparatus to present, to a user, a visual depiction of the lineage of the record. The visual depiction indicates the data flow of a query through at least the first component and the second component of the plurality of the components to generate the record.

A non-transitory computer-readable medium storing instructions that, when executed by processing circuitry of an apparatus, cause the apparatus to identify a plurality of components and a data flow that interconnects the plurality of components. The instructions determine a lineage of a record generated by the plurality of components based on the data flow. The lineage indicates the data flow from a first component to a second component of the plurality of components to generate the record. The instructions present, to a user, a visual depiction of the lineage of the record. The visual depiction indicates the data flow of the query through at least the first component and the second component of the plurality of the components to generate the record.

A method includes executing, by processing circuitry of an apparatus, instructions that cause the apparatus to identify a plurality of components and a data flow that interconnects the plurality of components. The instructions determine a lineage of a record generated by the plurality of components based on the data flow. The lineage indicates the data flow from a first component to a second component of the plurality of components to generate the record. The instructions present, to a user, a visual depiction of the lineage of the record. The visual depiction indicates the data flow of the query through at least the first component and the second component of the plurality of the components to generate the record.

In other features, identifying the plurality of components and the data flow includes storing a system map indicating a schema of the plurality of components. Determining the lineage of the record includes referring to the schema indicated by the system map to determine the lineage of the record. In other features, identifying the plurality of components and the data flow includes storing a system map indicating the data flow. Determining the lineage of the record includes referring to the data flow indicated by the system map to determine the lineage of the record.

In other features, identifying the plurality of components and the data flow includes storing the lineage of the record that indicates the data flow from the first component to the second component. Determining the lineage of the record includes referring to the lineage stored in association with the record. In other features, identifying the plurality of components and the data flow includes determining the plurality of components and the data flow in response to a request for the lineage of the record. Determining the lineage of the record includes referring to the determining in response to the request.

In other features, identifying the plurality of components and the data flow includes receiving a batch of updates to a system map and applying the batch of updates to the system map. Determining the lineage of the record includes referring to the system map including the batch of updates to determine the lineage of the record. In other features, identifying the plurality of components and the data flow includes receiving a stream of updates to a system map and applying each update of the stream of updates to the system map. Determining the lineage of the record includes referring to the system map including the updates of the stream to determine the lineage of the record.

In other features, executing the instructions further causes the apparatus to generate a lineage map that indicates the lineage of the record, the lineage map specified in a lineage language. In other features, executing the instructions further causes the apparatus to generate a lineage map that indicates the lineage of the record. The lineage map is specified in a lineage language. In other features, presenting the visual depiction includes generating a linear flow map including a linear axis that indicates a direction of the data flow and presenting a visual depiction of the data flow from the first component to the second component according to the direction indicated by the linear axis.

In other features, presenting the visual depiction includes generating a linear flow map including a linear axis that indicates a direction of the data flow and presenting a visual depiction of the data flow from the first component to the second component according to the direction indicated by the linear axis. In other features, presenting the visual depiction includes determining, for each component included in the data flow, a set of resources that are involved in the lineage of the record and presenting a visual depiction of the set of resources of each component that are involved in generating the record.

In other features, presenting the visual depiction of the set of resources includes initially presenting each component without the set of resources, receiving a selection of a selected component of the plurality of components, and updating the visual depiction in response to the selection to include the set of resources of the selected component that are involved in the lineage of the record. In other features, the record is included in a record set. Presenting the visual depiction of the lineage of the record includes receiving a selection of the record of the record set and presenting the visual depiction in response to the selection.

In other features, the record is associated with a query over the plurality of components. Presenting the visual depiction of the lineage of the record includes receiving a selection of the query and presenting the visual depiction of the lineage of the record that is associated with the query. In other features, presenting the visual depiction of the lineage of the record includes receiving a request to describe the plurality of components and the data flow and presenting the visual depiction of the lineage of the record in response to the request.

In other features, the data flow from the first component to the second component includes a transformation that transforms data transmitted by the first component to data received by the second component. The lineage of the record includes the transformation. Presenting the visual depiction of the lineage of the record includes presenting a visual depiction of the transformation between the first component and the second component. In other features, presenting the visual depiction of the transformation includes presenting the record before or after the transformation.

In other features, executing the instructions further causes the apparatus to receive a test involving the data flow including the transformation and apply the test to the record generated by the plurality of components based on the data flow to generate a test result. Presenting the visual depiction of the transformation includes presenting a visual depiction of the test result of the test. In other features, executing the instructions further causes the apparatus to receive a request to create or update a transformation included in the data flow between the first component and the second component. The transformation transforms data received from the first component to data received by the second component. Executing the instructions further causes the apparatus to create or update the transformation included in the data flow in response to the request.

In other features, executing the instructions further causes the apparatus to receive a request to filter the visual depiction based on a filter criterion and identify, from the plurality of components, a set of resources that satisfy the filter criterion. Presenting the visual depiction of the lineage of the record includes limiting the visual depiction to the set of resources. In other features, executing the instructions further causes the apparatus to identify, in the data flow, a conflict between data transmitted by the first component and data received by the second component. Presenting the visual depiction of the lineage of the record includes presenting a visual depiction of the conflict between the first component and the second component.

In other features, the data flow is associated with a query that is also associated with another data flow that differently interconnects the plurality of components. Executing the instructions further causes the apparatus to identify a conflict based on difference between the record produced by the data flow and another record produced by the another data flow. Presenting the visual depiction of the lineage of the record includes presenting a visual depiction of the conflict. In other features, the data flow is associated with a conflict. Executing the instructions further causes the apparatus to determine the conflict associated with the data flow and present, to a user, an alert involving the conflict associated with the data flow.

In other features, executing the instructions further causes the apparatus to determine a change in the plurality of components or the data flow and determine a change in the lineage of the record based on the change in the plurality of components or the data flow. Presenting the visual depiction of the lineage of the record includes presenting a visual depiction of the change in the lineage of the record. In other features, the change includes adding a third component to the plurality of components. The third component is included in the data flow. Determining the change in the lineage of the record includes determining the change in the lineage of the record based on the adding of the third component in the data flow. Presenting the visual depiction of the change in the lineage of the record includes presenting a visual depiction in the change in the lineage of the record based on including the third component in the data flow.

In other features, the change includes substituting a third component for one of the first component and the second component in the data flow. Determining the change in the lineage of the record includes determining the change in the lineage of the record based on the substituting of the third component in the data flow. Presenting the visual depiction of the change in the lineage of the record includes presenting a visual depiction in the change in the lineage of the record based on the substituting of the third component in the data flow.

In other features, the change in the plurality of components or the data flow includes a change in a key performance indicator of the data flow indicated by the lineage. Presenting the visual depiction of the lineage of the record includes presenting a visual depiction of the change in the key performance indicator of the data flow. In other features, executing the instructions further causes the apparatus to determine a reconciliation of the data flow between the first component and the second component based on the change in the plurality of components or the data flow. Presenting the visual depiction of the lineage of the record includes presenting a visual depiction of the reconciliation of the data flow between the first component and the second component.

A system includes a system map that identifies a plurality of components and a data flow that interconnects the plurality of components. The system includes a lineage determiner that determines, based on the system map, a lineage of a record generated by the plurality of components based on the data flow. The lineage indicates the data flow from a first component to a second component of the plurality of components to generate the record. The system includes a lineage presenter that presents, to a user, a visual depiction of the lineage of the record. The visual depiction indicates the data flow of the query through at least the first component and the second component of the plurality of the components to generate the record.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings. In the drawings, reference numbers may be reused to identify similar and/or identical elements.

DETAILED DESCRIPTION

A. Introduction

Figure 1:
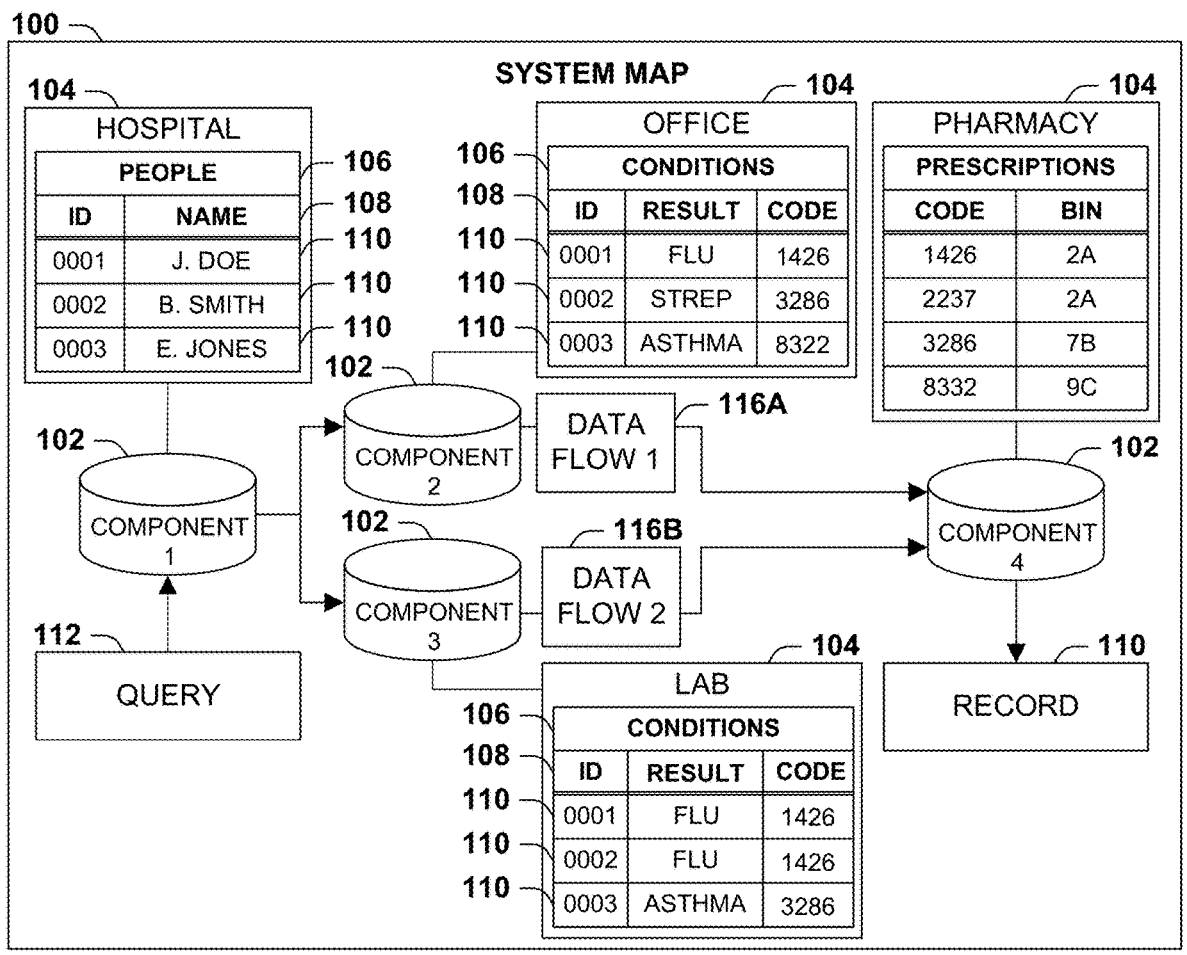
FIG. 1 is an illustration of an example scenario featuring a set of components that store and provide data in order to process queries.

FIG. 1 is an illustration of an example scenario featuring a set of components that store and provide data in order to process queries.

The example scenario of FIG. 1 includes a system map 100 of components 102 that store and provide portions of a distributed data set. In this example scenario, the components 102 may be servers that are interconnected over one or more networks, such as the Internet or a local Ethernet and/or WiFi connection. For example, the distributed data set may include data from a patient population of a healthcare system, and each component 102 may represent a portion of the data set that is stored and/or provided by an entity 104 serving as a service provider, such as a hospital, a doctor's office, a clinical laboratory, and a pharmacy.

Each entity 104 may host, use, and/or manage one or more components 102, such as a data service that interoperates with the data services of other service providers to exchange data relating to the patient population. As an example, each entity 104 may store a database comprising one or more tables 106, wherein each table 106 includes a set of attributes 110 and a set of records 108 including a set of values for each of the attributes 110. For example, a first entity 104 representing a hospital may store a People table 106 with attributes 110 such as an identifier (an integer) and a name (a string), and each record 108, representing one individual, may include a set of values for each of the attributes 110, such as an identifier value (0001) and a name ("J. Doe").

The example scenario of FIG. 1 includes a query 112 that is processed upon the distributed data set stored by the components 102. Fulfilling the query 112 may involve distributed processing by the components 102 to assemble the data that is responsive to the logic specified by the query 112. For example, a query 112 submitted to a pharmacy entity 104 may specify a name of an individual, and may request a prescription that has been prescribed to the individual.

The query 112 may be fulfilled by examining the People table 106 of the component 102 provided by the Hospital entity 104 to determine an identifier that matches the specified name. The retrieved identifier may be provided to a second component 102 for an Office entity 104 where the individual was examined by a healthcare provider, and the second component 102 may examine a Conditions table 106 that indicates a diagnosis of each individual and a code of a prescription for the condition. For example, a first individual ("J. Doe," ID 0001) may have been diagnosed with influenza, which is treatable by a prescription identified by the code 1426. Alternatively, the retrieved identifier may be provided to a third component 102 for a Clinical Laboratory entity 104 where a sample of the individual was tested and found to indicate influenza, which is treatable by a prescription identified by the code 1426. In either case, the code 1426 may be provided to a fourth component 102 for the Pharmacy entity 104, which may examine a Prescriptions table 106 to determine a bin in which a prescription for a particular pharmaceutical that is commonly prescribed to treat influenza (identified by the code 1426) is stored. In this manner, the components 102 may interoperate to process the query 112 in a distributed manner and to return a record 108 that is responsive to the query 112.

The example scenario of FIG. 1 further shows that the query 112 may be specified in a query language 114, such as a variant of the Structured Query Language (SQL), according to a logical schema of the resources provided by the components 102 of the system map 100. For example, the logical schema may indicate that the People table 106 has an association with a Conditions table 106 (based on a first foreign-key relationship involving the "ID" attributes 110 of each table 106), and that the Conditions table 106 has an association with a Prescriptions table 106 (based on a second foreign-key relationship involving the "Code" attributes 110 of each table 106). The query 112 may specify, according to the query language 114, the logical process of assembling the requested record 108.

Notably, the schema may specify the logical structure and associations of the resources of the distributed data set, such as the tables 106, attributes 110, foreign-key relationships, etc., irrespective of the distribution of such resources among the components 102 of the system map. For example, the query 112 may specify a logical interconnection of the People table 106, the Conditions table 106, and the Prescription table 106 irrespective of which component 102 stores each table 106. Instead, a data flow 116 may be established to indicate the stepwise processing of the query 112 through the distributed resources of the components 102 of the system map 100, based on the physical locations of the resources specified in the query 112. That is, the data flow 116 may indicate the sequence of operations performed by each component 102 of the system map 100 and the sequence of exchanging data among the components 102 in order to process the distributed query 112.

However, in some example scenarios, the processing of the query 112 may encounter difficulties due to the distributed organization of the components 102. For example, each entity 104 may store, maintain, and provide resources such as data, and may do so according to the circumstances of each entity 104, such as the meaning of the data to each entity 104; the manner in which the data is acquired and/or used by each entity 104; and the computational resources that are available to each entity 104 and provided to each component 102.

Sometimes, a mismatch may arise between the resources of a first component 102 managed by a first entity and the resources of a second component 102 managed by a second entity 104. Such discrepancies may arise, for example, due to different circumstances in which data is acquired and/or used by each entity 104; technical differences between the components 102 managed by each entity 104, such as different data formats; data version conflicts between similar data that is stored by each entity 104; and/or imperfect communication among the entities 104 as to the meaning of the data included in the data set.

In some circumstances, the mismatch may be detected by the components 102, for example, when a first component 102 sends a record to a second component 102, and the record 102 sent by the first component 102 does not correspond to an expected matching record of a second component 102. In other circumstances, the mismatch may not be detected by the components 102 involved in the mismatch, but by a later component 102 in a data flow 116, such as a fourth component 102 that receives a mismatched data set generated by the first component 102 and the second component 102, where the fourth component 102 discovers a discrepancy while attempting to validate or use the mismatched data set. In some cases, the mismatch may not be detected by the components 102, resulting in a record 108 that includes incorrect information.

In the event of a mismatch, a user (such as an administrator of the data set) may endeavor to discover the cause of the mismatch in the processing of the query 112. In some cases, the cause of the mismatch may be discernible by examining the query 112, for example, by determining that a logical operation specified in the query 112 is processed differently than a designer of the query 112 intended. In some cases, the cause of the mismatch may be discernible by comparing the query 112 to the logical schema of the distributed data set; for example, a first attribute 110 of a first table 106 may have a foreign-key relationship with a second attribute 110 of a second table 106, but the format of the first attribute 110 (e.g., a 16-bit integer) may not match the format of the second attribute 110 (e.g., a 32-bit integer).

However, in some further cases, the cause of the mismatch may be due to the data flow 116 interconnecting the components 102 of the system map 100. That is, mismatches may occur due to the manner in which the components 102 of the system map 100 incrementally process the query 112 and exchange data according to a selected data flow 116.

The example scenario of FIG. 1 shows a first data flow 116A by which a query 112 may be processed using a sequence of the People table 106 of the first component 102, the Conditions table 106 of the second component 102, and the Prescriptions table 106 of the fourth component 102. The example scenario of FIG. 1 also shows a second data flow 116B by which a query 112 may be processed using a sequence of the People table 106 of the first component 102, the Conditions table 106 of the third component 102, and the Prescriptions table 106 of the fourth component 102. In each case, processing the query 112 for a first individual (such as "J. Doe") may result in the same record 108 irrespective of whether the first data flow 116A or the second data flow 116B is selected.

The example scenario of FIG. 1 shows a first example of a mismatch that may occur when processing the query 112 for a second individual (such as "B. Smith") based on the selected data flow 116. In this first example, the data stored in the Conditions table 106 of the Office entity 104 (stored by the second component 102) may not be fully synchronized with the data stored in the Conditions table 106 of the Clinical Laboratory entity 104 (stored by the third component 102). Such asynchrony may arise, for example, due to an inconsistent creation of data in each component 102 (such as where different data is entered into each component 102) and/or data version conflicts (such as an updating of the data stored by one component 102 without yet updating the corresponding data stored by the other component 102).

When the query is processed for the second individual through the first data flow 116A, the second component 102 provides the code for a prescription for strep throat; but when the query is processed for the second individual through the second data flow 116B, the third component 102 provides the code for a prescription for influenza. As a result, the fourth component 102 provides a different response to the query 112 processed through each data flow 116, and the record 108 may include a different indication of the bin for the pharmaceutical prescribed to the individual.

The example scenario of FIG. 1 shows a second example of a mismatch that may occur when processing the query 112 for a third individual (such as "E. Jones") based on the selected data flow 116. In this second example, the Conditions table 106 of the Office entity 104 and the Conditions table 106 of the Clinical Laboratory entity 104 may store a similar set of attributes 110, but the semantics of the attributes 110 may differ between the components. For example, the "Code" attribute 110 used by the first component 102 may specify a first encoding of pharmaceutical prescriptions, while the "Code" attribute 110 used by the first component 102 may specify a second encoding of pharmaceutical prescriptions, such as different versions of a National Drug Code Directory that is periodically updated with new and different National Drug Code (NDC) numbers for different pharmaceuticals.

Such distinctions may reflect different semantics in the data stored by each component 102 as used by each entity 104, where such semantic differences may not be readily apparent from the data or the logical schema. As a result, when the query 112 is processed based on the first data flow 116A, the value of the "Code" attribute 110 provided by the second component 102 may semantically correspond to the "Code" attribute 110 provided by the fourth component 102, resulting in a record 108 including a correct bin number for a prescribed pharmaceutical (such as the prescription to treat asthma); but when the query 112 is processed based on the second data flow 116B, the value of the "Code" attribute 110 provided by the third component 102 may not semantically correspond to the "Code" attribute 110 provided by the fourth component 102, resulting in a record 108 including an incorrect bin number for a prescribed pharmaceutical (such as the prescription to treat influenza).

As shown in the examples of FIG. 1, mismatches may arise due to the use of different data flows 116 in the processing of a query 112. In some cases, the causes of such mismatches not be apparent from either the query 112 or the logical schema of the resources provided by each component 102, particularly since the query 112 and the logical schema may be abstracted from the physical organization of the components 112. That is, the same query 112 (as indicated in the query language 114 of FIG. 1) may result in different records 108 due to differences in the data flow 116 by which the query 112 is processed.

For example, each component 102 may be managed by a different entity 104, and a change in the resources that are stored, managed, and/or provided by a first entity 104 may cause an asynchrony with respect to the resources that are stored, managed, and/or provided by a second entity 104 (such as a first entity updating the values of the "Code" attribute to reflect an updated NDC encoding version, while a second entity retains the values of the "Code" attribute based on a previous NDC encoding version). If the logical schema includes a table 106 that is distributed over the component 102 of the first entity 104 and the component 102 of the second entity 104, then some records 108 of the distributed table 106 (involved in a first data flow 116A) may use a different semantic for the "Code" attribute 110 than other records 108 of the distributed table 106 (involved in a second data flow 116B), and the discrepancy may not be apparent from the query 112 or the logical schema.

As another example, a query 112 may be reconfigured from a first data flow 116A to a second data flow 116B, where the resources provided by the components of each component 102 are expected to correspond. However, a mismatch in the data by each component 102 (e.g., a semantic difference in the data stored by each component 102) may therefore result in different records 108 being provided in response to the same query 112. A determination of the cause of the mismatch may be difficult, for example, due to the fact that neither the query 112, the logical schema, nor the resources stored by the components 102 may have changed, and the incorrect expectation that changing the data flow 116 does not affect the semantics of the query 112.

B. Record Lineage

Figure 2A:
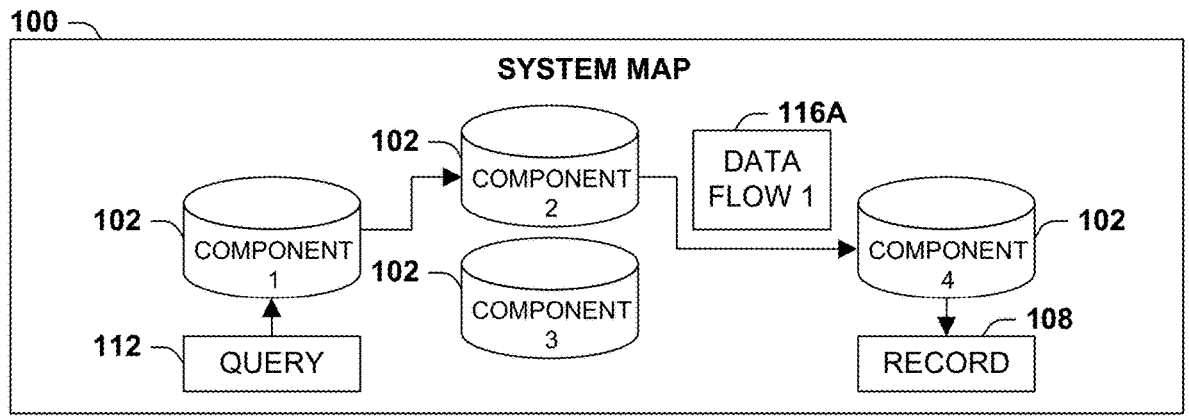
FIG. 2A is an illustration of an example scenario featuring a presentation of a lineage of a record provided in response to a query that is processed by a set of components based on a data flow, in accordance with some example embodiments.
Figure 2A:
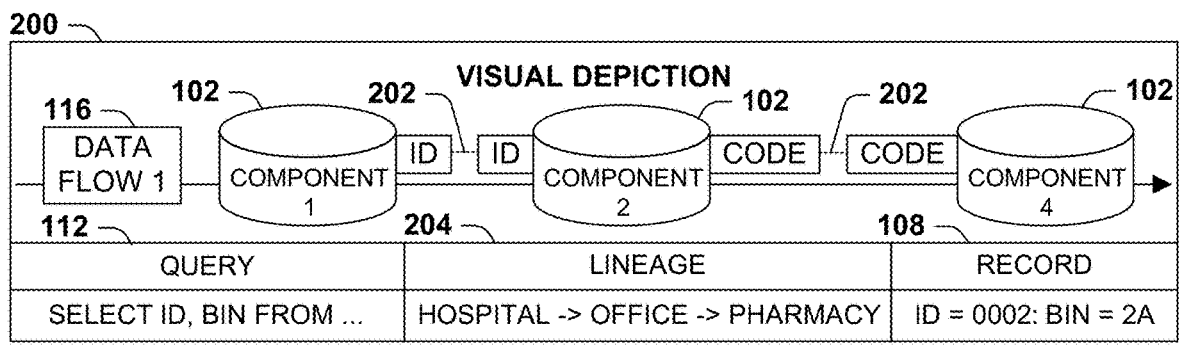
Figure 2B:
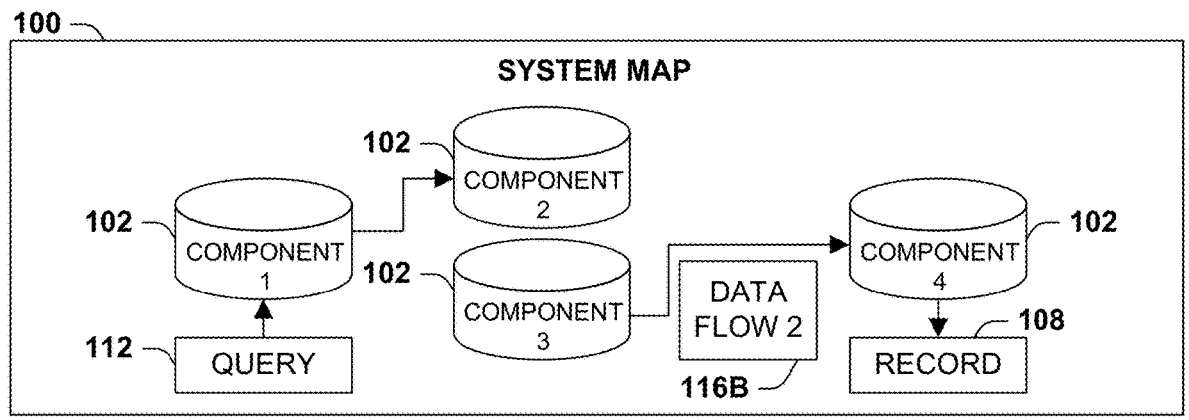
FIG. 2B is an illustration of another example scenario featuring a presentation of a lineage of a record provided in response to a query that is processed by a set of components based on a data flow, in accordance with some example embodiments.
Figure 2B:
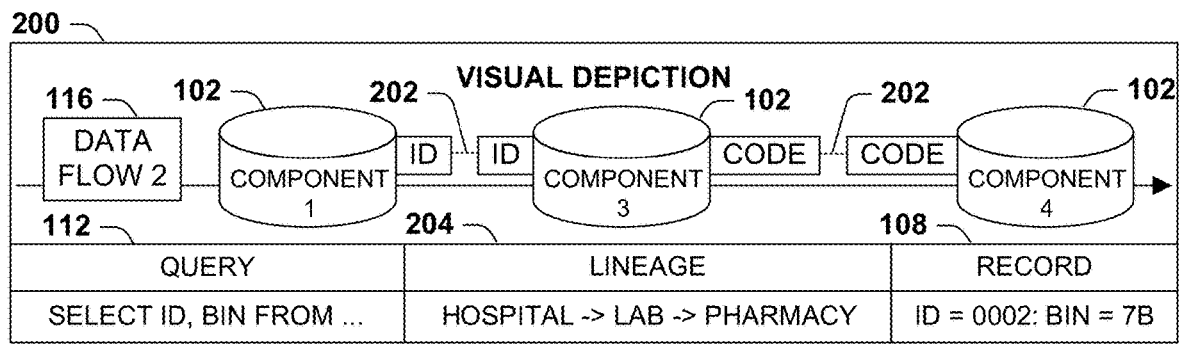

FIGS. 2A and 2B are illustrations of some example scenarios featuring a presentation of a lineage of a record provided in response to a query that is processed by a set of components based on a data flow, in accordance with some example embodiments.

In FIG. 2A, a query 112 is processed through a set of components 102 according to a first data flow 116A, which may be represented and/or depicted by a system map 100. The processing of the query 112 results in a record 108 that may be provided in response to the query 112. The processing may be presented to a user as a first visual depiction 200 that indicates the lineage 204 of the record 108 based on the processing of the query 112 according to the first data flow 116A. The lineage 204 of the record 108 indicates that the record 108 was generated, for example, by a first processing of the query 112 by a first component 102; a first data transfer (such as a partially processed query result, an intermediate data set, etc.) from the first component 102 to a second component 102, for example, based on an association 202 such as a foreign-key relationship between attributes 106 of tables 104 stored by the first and second components 102; a second processing of the query 112 by the second component 102; a second data transfer (such as a second partially processed query result, a second intermediate data set, etc.) from the second component 102 to a fourth component 102, for example, based on another association 202 such as a foreign-key relationship between attributes 106 of tables 104 stored by the second and fourth components 102; and a third processing of the query 112 by a fourth component 102. The record 108 produced by processing the query 112 based on the first data flow 116A may be included in the first visual depiction 200.

In FIG. 2B, the same query 112 is processed through a set of components 102 according to a second data flow 116B, which may be represented and/or depicted by a system map 100. The processing of the query 112 results in a record 108 that may be provided in response to the query 112. The processing may be presented to a user as a second visual depiction 200 that indicates the lineage 204 of the record 108 based on the processing of the query 112 according to the second data flow 116B. The lineage 204 of the record 108 indicates that the record 108 was generated, for example, by a first processing of the query 112 by a first component 102; a first data transfer (such as a partially processed query result, an intermediate data set, etc.) from the first component 102 to a third component 102, for example, based on an association 202 such as a foreign-key relationship between attributes 106 of tables 104 stored by the first and third components 102; a second processing of the query 112 by the third component 102; a second data transfer (such as a second partially processed query result, a second intermediate data set, etc.) from the third component 102 to a fourth component 102, for example, based on another association 202 such as a foreign-key relationship between attributes 106 of tables 104 stored by the third and fourth components 102; and a third processing of the query 112 by a fourth component 102. The record 108 produced by processing the query 112 based on the second data flow 116B may be included in the second visual depiction 200.

As shown in FIGS. 2A and 2B, the same query is processed by two different data flows 116, and the lineage 204 of a first record 108 produced by processing the query 112 based on the first data flow 116A is different than the lineage 204 of a second record 108 produced by processing the same query based on the second data flow 116B. Due to the different data flows 116 used to process the same query 112, different records 108 may be produced in response to the query 112, even though neither the query, the logical schema and contents the resources used by the query 112, nor the set of components 102 included in the system map 100 has changed. Further, the information conveyed by the lineage 204 may be distinct from, and may not be apparent from, the logical contents of the query 112.

C. Some Example Technical Effects

In some example embodiments, determining and presenting the lineage 204 of a record 108, as an indication of the data flow 116 by which the query 112 was processed to generate the record 108 may therefore enable a user (such as an administrator) to understand the manner in which the query 112 over the distributed data set is processed by the set of components 102, in some example embodiments.

In some example embodiments, a user may review the lineage 204 to determine the resources provided by the components 102 that were involved in the processing of the query 112 resulting in the record 108 (that is, not just a logical table 106 over which the query 112 was executed, but where the logical table 106 is physically located in the system map 100).

In some example embodiments, a user may review the lineage 204 of one or more records 108 produced in response to a query 112 to determine the sequence of components 102 by which the query 112 was processed in a stepwise manner according to the data flow 116 (that is, data provided by a first component 102 to a third component 102 to a fourth component 102, or another sequence, optionally including parallel processing and/or iterative or recursive processing between or among two or more components 102).

In some example embodiments, a user may review the lineage 204 of one or more records 108 produced in response to a query 112 to determine a cause of a mismatch between components 102 (such as the associations 202 between the resources provided by associated components 102 over which portions of a partially processed query 112 were transferred, such as foreign-key relationships between tables 106 stored by different components 102).

In some example embodiments, a user may review the lineage 204 of one or more records 108 produced in response to a query 112 to determine a change in the data flow 116 by which a query was processed 112 that may have resulted in different records 108. As a first such example, a first data flow 116A used at a first time (such as shown in the example scenario of FIG. 2A) and a second data flow 116B used at a second time (such as shown in the example scenario of FIG. 2B), where the records 108 produced by each data flow 116 are expected to be the same but are in fact different. Such change may occur, for example, because the third component 102 is substituted for the second component 102 in the system map 100, and/or because a resource that is initially provided by the second component 102 is transferred to a second component 102. As a second such example, a table 106 may be distributed over two components 102, and the records 108 produced by processing the query 112 over some portions of the table 106 may differ in unexpected ways from other records 108 produced by processing the same query 112 over some portions of same table 106. The lineage 204 may indicate that the different sets of records were produced according to different data flows 116 due to a distribution of the table 106 over two or more components 102, each storing and/or providing a subset of the data used to produce each record 108. In each example, a determination that the lineages 204 of the respective records 108 has changed may assist the user 102 in determining the cause of the discrepancy.

In some example embodiments, a user may review the lineage 204 of one or more records 108 produced in response to a query 112 to explore how such the processing of such queries 112 might be affected by a change to the system map 100, such as adding one or more components 102, moving data or resources (such as a table 106 of the data set) from one component 102 to another component 102, consolidating data or resources from a plurality of components 102 to a smaller number of components 102, and/or removing one or more components 102 from the system map 100. Such consideration may be retroactive (e.g., describing for a user how an applied change has affected the processing of queries 112); prospective (e.g., enabling a user to experiment with such changes and to predict, simulate, and/or explain such changes); and/or suggestive (e.g., notifying a user how a change may improve, degrade, enable, prevent, alter, and/or affect the processing of queries 112). A presentation of the lineage 204 of a record 108 generated by a query 112 based on a data flow 116 and any such change to the system map 100, components 102, data, resources, queries 112, and/or data flows 116 may inform the user as to the consequences of the change on the processing of queries 112 upon the data set. These and other technical effects may arise in some example embodiments.

D. Some Example Embodiments

Figure 3:
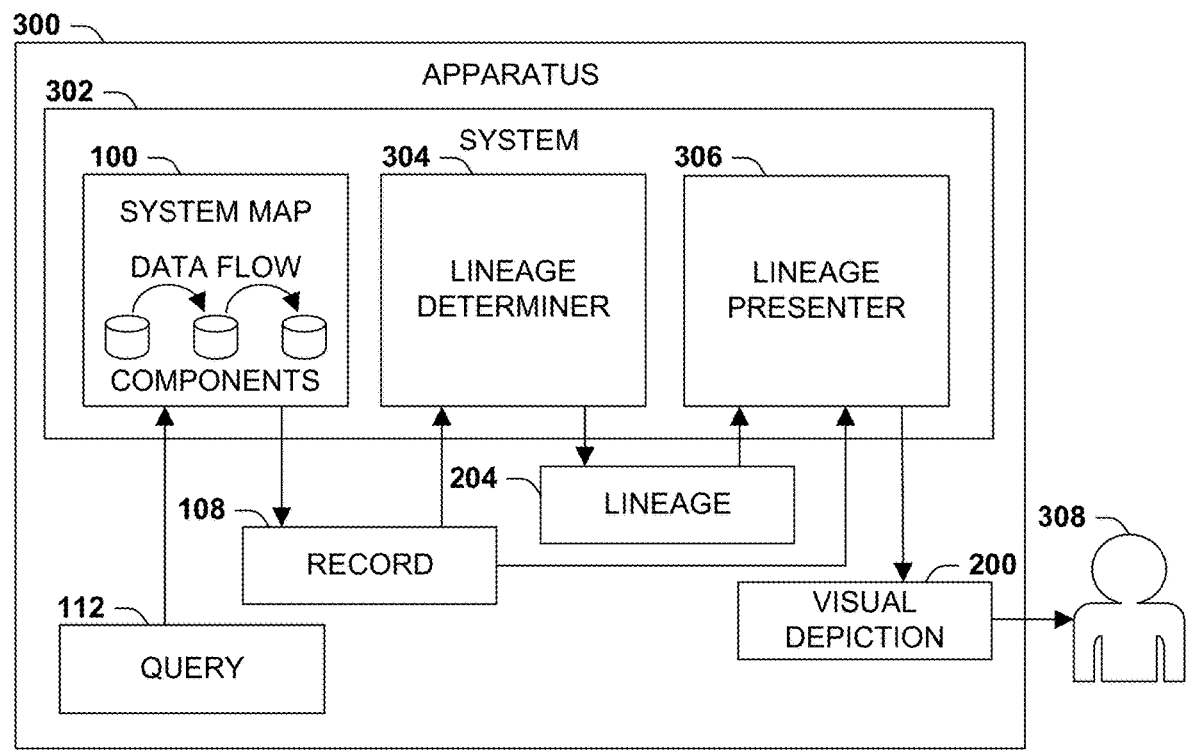
FIG. 3 is a component block diagram of an example apparatus, in accordance with some example embodiments.

FIG. 3 is a component block diagram of an example apparatus 300, in accordance with some example embodiments.

As shown in FIG. 3, an example apparatus 300 may include an example system 302 that is configured to present a lineage 204 of a query 112 processed to generate a record 108 according to a data flow 116.

The example system 302 includes a system map 100 that identifies a plurality of components 102 and a data flow 116 that interconnects the plurality of components 102. The system map 100 may be, for example, an organizational diagram of the plurality of components 102 and the data flows 116 occurring therein. The system map 100 may be, for example, an object graph of objects respectively representing each of the plurality of components 102 and the data flows 116 occurring therein. The system map 100 may be, for example, a hierarchical description specified in a structured language, such as Structured Query Language (SQL), Extensible Markup Language (XML), and/or JavaScript Object Notation (JSON).

The example system 302 includes a lineage determiner 304 that determines, based on the system map 100, a lineage 204 of a record 108 generated by the plurality of components 102 based on the data flow 116, wherein the lineage 204 indicates the data flow 116 from a first component 102 to a second component 102 of the plurality of components 102 to generate the record 108. The lineage determiner 304 may be implemented, for example, as a set of instructions stored in a memory of the apparatus 300 and executed by processing circuitry 402 of the apparatus 300; as a discrete circuit, such as an Application-Specific Integrated Circuit (ASIC), a Field-Programmable Gate Array (FPGA), or the like; or a combination thereof.

The example system 302 includes a lineage presenter that presents, to a user 308, a visual depiction 200 of the lineage 204 of the record 108, wherein the visual depiction 200 indicating the data flow 116 of the query 112 through at least the first component 102 and the second component 102 of the plurality of the components 102 to generate the record 108. The lineage presenter 306 may be implemented, for example, as a set of instructions stored in a memory of the apparatus 300 and executed by processing circuitry 402 of the apparatus 300; as a discrete circuit, such as an Application-Specific Integrated Circuit (ASIC), a Field-Programmable Gate Array (FPGA), or the like; or a combination thereof. The lineage presenter 306 may present the visual depiction 200 to the user 308, for example, by displaying the visual depiction 200 on a display of the apparatus 300 for the user 308, or by sending the visual depiction 200 to another device that is capable of displaying the visual depiction 200 to the user 308, for example, as an image or a rendering such as a Hypertext Markup Language (HTML) document. The visual depiction 200 may be presented, for example, using colors, icons, bitmaps, graphs or charts, images, visual effects such as animation, videos, and/or text in various languages. In this manner, the example system 302 causes the apparatus 300 to present the visual depiction 200 of the lineage 204 of the record 108 to the user 308 in accordance with some example embodiments.

Figure 4:
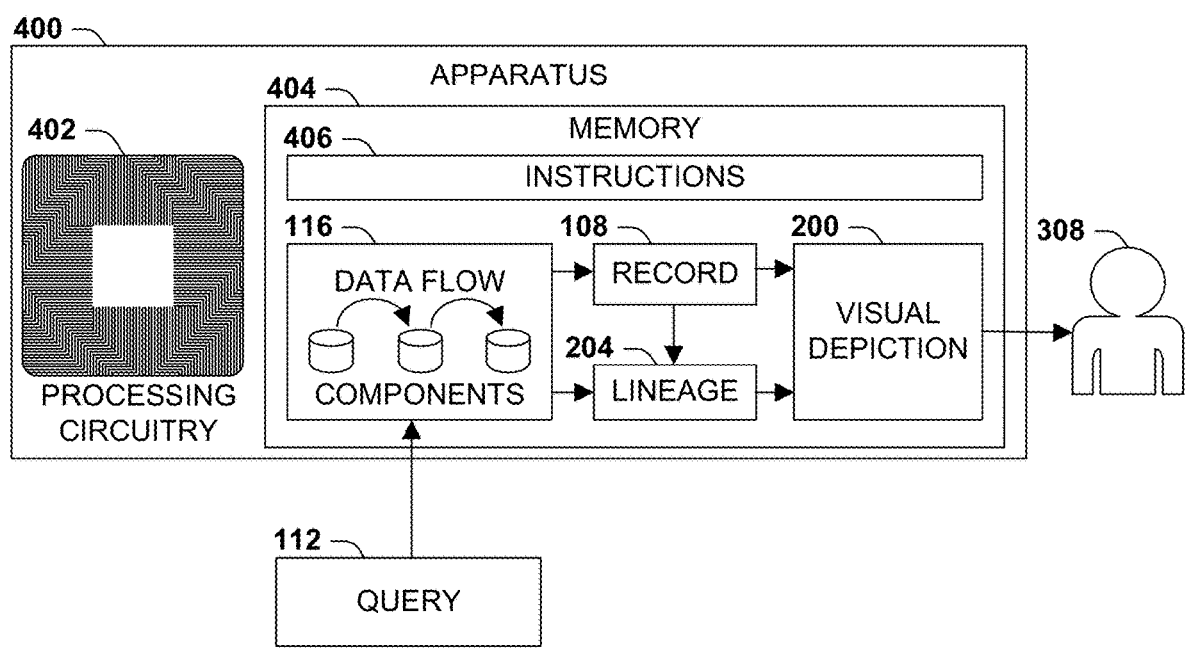
FIG. 4 is a component block diagram of another example apparatus, in accordance with some example embodiments.

FIG. 4 is a component block diagram of another example apparatus, in accordance with some example embodiments.

As shown in FIG. 4, an example apparatus 400 may include processing circuitry 402 that is capable of executing instructions. The processing circuitry 402 may include, such as hardware including logic circuits; a hardware/software combination, such as a processor executing software; or a combination thereof. For example, a processor may include, but is not limited to, a central processing unit (CPU), a graphics processing unit (GPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

As shown in FIG. 4, the example apparatus 400 includes a memory 404 storing instructions 406. The memory 404 may include, for example, random-access memory (RAM), read-only memory (ROM), an erasable programmable read-only memory (EPROM), an electrically erasable programmable read-only memory (EEPROM), etc. The memory 404 may be volatile, such as system memory, and/or nonvolatile, such as a hard disk drive, a solid-state storage device, flash memory, or magnetic tape. The instructions 406 stored in the memory 404 may be specified according to a native instruction set architecture of a processor, such as a variant of the IA-32 instruction set architecture or a variant of the ARM instruction set architecture, as assembly and/or machine-language (e.g., binary) instructions; instructions of a high-level imperative and/or declarative language that is compilable and/or interpretable to be executed on a processor; and/or instructions that are compilable and/or interpretable to be executed by a virtual processor of a virtual machine, such as a web browser. A set of non-limiting examples of such high-level languages may include, for example: C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Swift, Eiffel, Smalltalk, Erlang, Ruby, Flash®, Visual Basic®, Lua, MATLAB, SIMULINK, and Python®. Such instructions 406 may also include instructions for a library, resource, platform, application programming interface (API), or the like that is used in the presentation of the visual depiction 200 of the lineage 204 of a record 108 based on a data flow 116.

The instructions 406 stored in the memory 404, when executed by the processing circuitry 402, cause the apparatus 400 to operate in accordance with some example embodiments. For example, the instructions 406 may cause the apparatus 400 to identify a plurality of components 102 and a data flow 116 that interconnects the plurality of components 102; to determine a lineage 204 of a record 108 generated by the plurality of components 102 based on the data flow 116, wherein the lineage 204 indicates the data flow 116 from a first component 102 to a second component 102 of the plurality of components 102 to generate the record 108; and to present, to a user 308, a visual depiction 200 of the lineage 204 of the record 108, wherein the visual depiction 200 indicates the data flow 116 of the query 112 through at least the first component 102 and the second component 102 of the plurality of the components 102 to generate the record 108.

Figure 5:
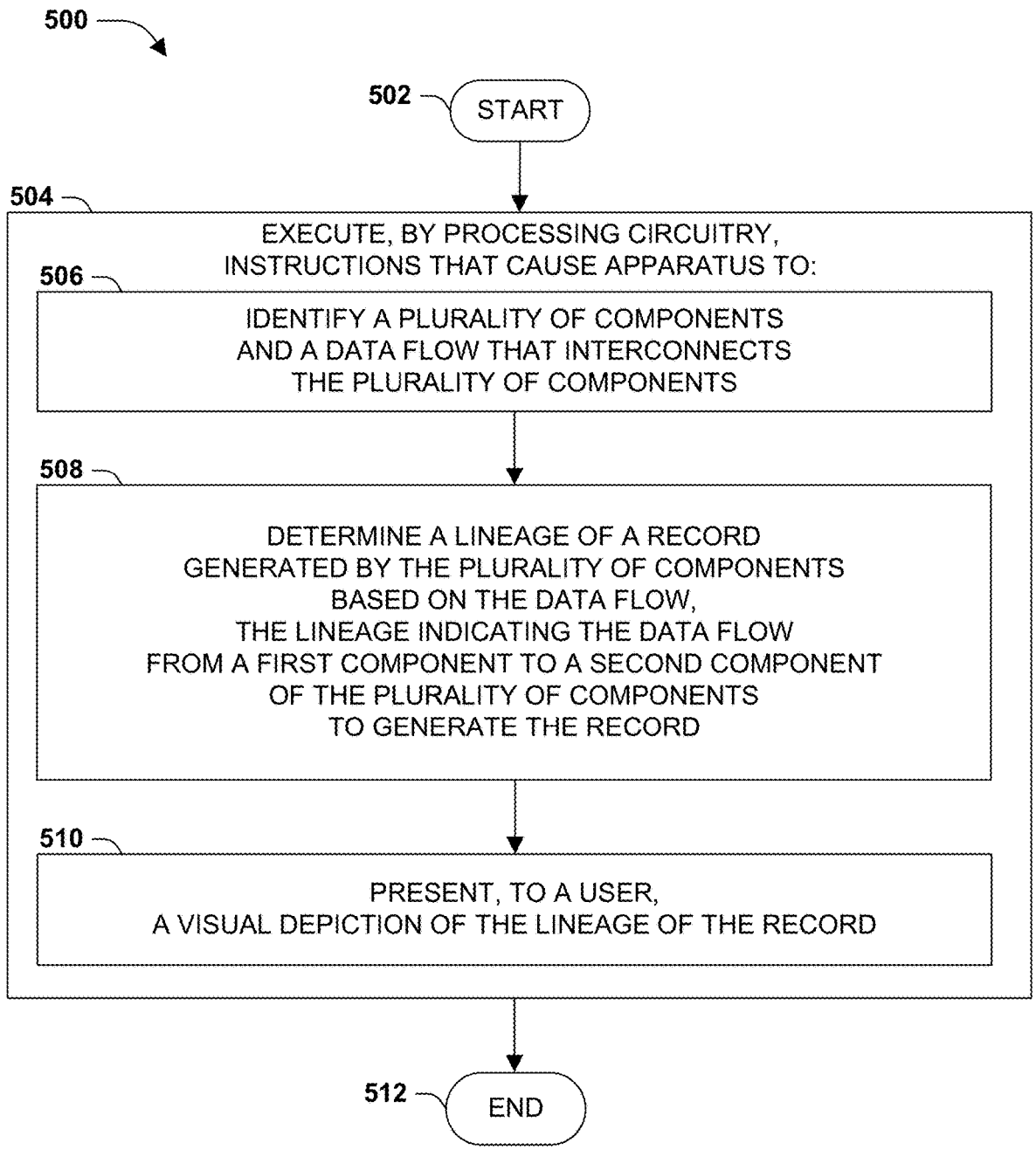
FIG. 5 is a flow diagram of an example method, in accordance with some example embodiments.

FIG. 5 is a flow diagram of an example method 500, in accordance with some example embodiments.

The example method 500 may be implemented, for example, as a set of instructions 406 that, when executed by processing circuitry 402 of an apparatus 400, cause the apparatus 400 to perform each of the elements of the example method 500. The example method 500 begins at 502 and may include executing 504, by processing circuitry 402 of an apparatus 400, instructions 406 that cause the apparatus 400 to perform a set of elements.

For example, the execution of the instructions 406 may cause the apparatus 300 to identify 506 a plurality of components 102 and a data flow 116 that interconnects the plurality of components 102.

For example, the execution of the instructions 406 may cause the apparatus 300 to determine 508 a lineage 204 of a record 108 generated by the plurality of components 102 based on the data flow 116, the lineage 204 indicating the data flow 116 from a first component 102 to a second component 102 of the plurality of components 102 to generate the record 108.

For example, the execution of the instructions 406 may cause the apparatus 300 to present 510, to a user 308, a visual depiction 200 of the lineage 204 of the record 108, the visual depiction 200 indicating the data flow 116 of the query 112 through at least the first component 102 and the second component 102 of the plurality of the components 102 to generate the record 108.

In this manner, the execution of the instructions 406 by the processing circuitry 402 may cause the apparatus 400 to perform the elements of the example method 500, and so the example method 500 ends at 512.

Figure 6:
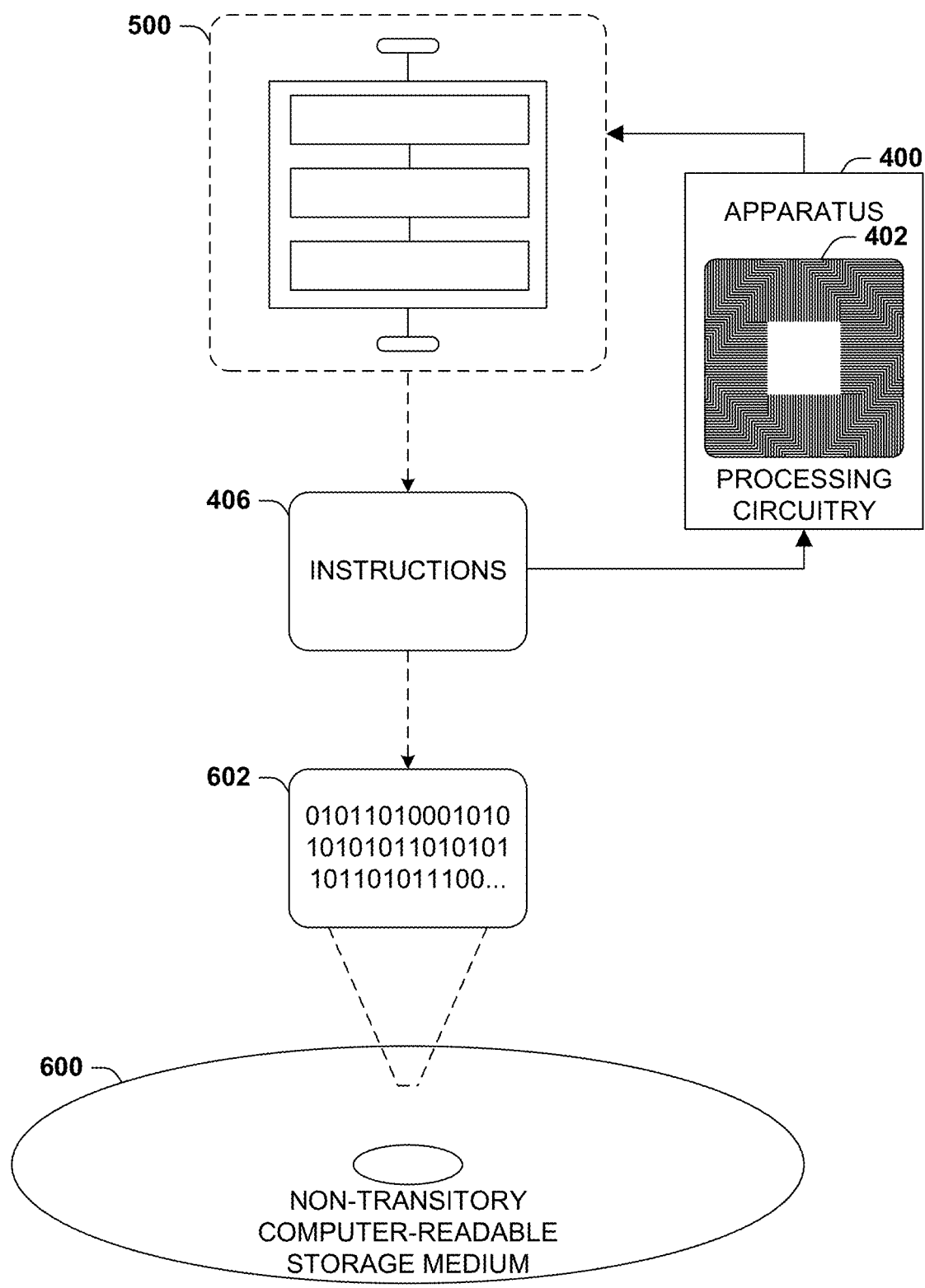
FIG. 6 is an illustration of an example non-transitory computer-readable storage medium, in accordance with some example embodiments.

FIG. 6 is an illustration of an example non-transitory computer-readable storage medium 600, in accordance with some example embodiments.

As shown in FIG. 6, the non-transitory computer-readable storage medium 600 may store binary data encoding a set of instructions 406 that, when executed by processing circuitry 402 of an apparatus 400, cause the apparatus 402 to present a lineage 204 of a record 108 in accordance with some example embodiments, for example, by causing an apparatus 300 to identify a plurality of components 102 and a data flow 116 that interconnects the plurality of components 102; determine a lineage 204 of a record 108 generated by the plurality of components 102 based on the data flow 116, wherein the lineage 204 indicating the data flow 116 from a first component 102 to a second component 102 of the plurality of components 102 to generate the record 108; and present, to a user 308, a visual depiction 200 of the lineage 204 of the record 108, wherein the visual depiction 200 indicates the data flow 116 of the query 112 through at least the first component 102 and the second component 102 of the plurality of the components 102 to generate the record 108. As a first such example, the instructions 604 may encode the elements of an example method of presenting a lineage 204 of a record 108, such as the example method 500 of FIG. 5. As a second such example, the instructions 604 may encode a set of software components, such as a system map 100, a lineage determiner 304, and/or a lineage presenter 306 as shown in the example system 302 in the example scenario of FIG. 3. Many such technologies may be used in some example embodiments of the present disclosure.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in some example embodiments (e.g., the example apparatus 300 of FIG. 3, the example system 302 of FIG. 3, the example apparatus 400 of FIG. 4, the example method 500 of FIG. 5, and/or the example non-transitory computer-readable medium 600 of FIG. 6) to confer individual and/or synergistic advantages upon such example embodiments.

E1. Scenarios

Some example embodiments of the present disclosure may be used in a variety of scenarios that may include a visual depiction 200 of a lineage 204 of a record 108 that is responsive to a query 112 processed by a data flow 116 through a set of components 102.

As a first example, such scenarios may include a variety of data sets, such as databases, file systems, object systems, and the like. Such data sets may represent data may be domain-specific, such as records of patients within a healthcare system, objects in an object inventory, or locations in a map, or may be unspecific with respect to any domain. Such data sets may be unstructured, for example as a flat collection of data items, or may be structured in various ways, such as a relational data set, such as a relational database; a hierarchy; a set of groups; a network; and a graph that may be directed, undirected, cyclic, and/or acyclic. Such data sets may be represented using a variety of data definition languages, such as Structured Query Language (SQL), Extensible Markup Language (XML) Schema, and JavaScipt Object Notation (JSON) Schema, and variants and combinations thereof. Such data sets may be queried using a variety of data query languages and/or data manipulation languages, such as Structured Query Language (SQL), XML, and JSON.

As a second example, such scenarios may be usable with a variety of system maps 100 including a variety of components 102. Such components 102 may be, for example, individual servers in distributed server set over which the data set is distributed, such as a distributed database, and by which the servers communicate over a local-area network (e.g., a cluster) and/or a wide-area network (e.g., the Internet). Such components 102 may be controlled, managed, and/or provided for one entity 104, such as an organization or a government; for different entities 104 that are organized in various ways, such as a hierarchy; or for a decentralized set of different entities 104, such as a network of intercommunicating service providers. In some example embodiments, two or more components 102 may be included in a single apparatus, such as a set of databases stored a device, and/or one component 102 may be provided by two or more apparatuses, such as a database distributed over two or more apparatuses. Such components 102 may use a variety of communication technologies and wire protocols, such as a transmission control protocol (TCP), universal datagram protocol (UDP), internet protocol (IP), hypertext transport protocol (HTTP), bus technologies such as Universal Serial Bus (USB), Ethernet, Fibre Channel (FC), wireless communication standards such as WiFi and cellular communication, and the like. Such components 102 may communicate using a variety of communication media, such as wires, cables, buses, fiber optics, and radiofrequency (RF) wireless communication.

As a third example, such scenarios may be used by a variety of users, including individuals such as administrators, agents, end users, customers, and service providers, as well as automated processes, such as applications executing within or outside of the set of components 102. Such scenarios may involve a variety of queries submitted by such users, including requests to create, read, update, delete, copy, move, choose, filter, merge, partition, or otherwise alter the records 108 of the data set; logical operations that may be applied to such records 108, such as select, project, join, filter, sort, group, and count operations; and schema-based queries such as defining and/or altering the data set, the distribution of the data set over the components 102, and/or the administration the components 102, such as provisioning, relocating, duplicating, and/or removing resources. Many such scenarios may be suitable environments for a visual depiction 200 of a lineage 204 of a record 108 in response to a query 112 processed according to a data flow 116 through the components 102 in accordance with the techniques presented herein.

E2. Identifying Data Flow and Determining Record Lineage

In some example embodiments, a data flow 116 that interconnects a plurality of components 102 for the processing of a query 112 may be identified in a variety of ways. Additionally, the lineage 204 of a record 108 that is processed by such data flows 116 may be determined in a variety of ways.

Figure 7A:
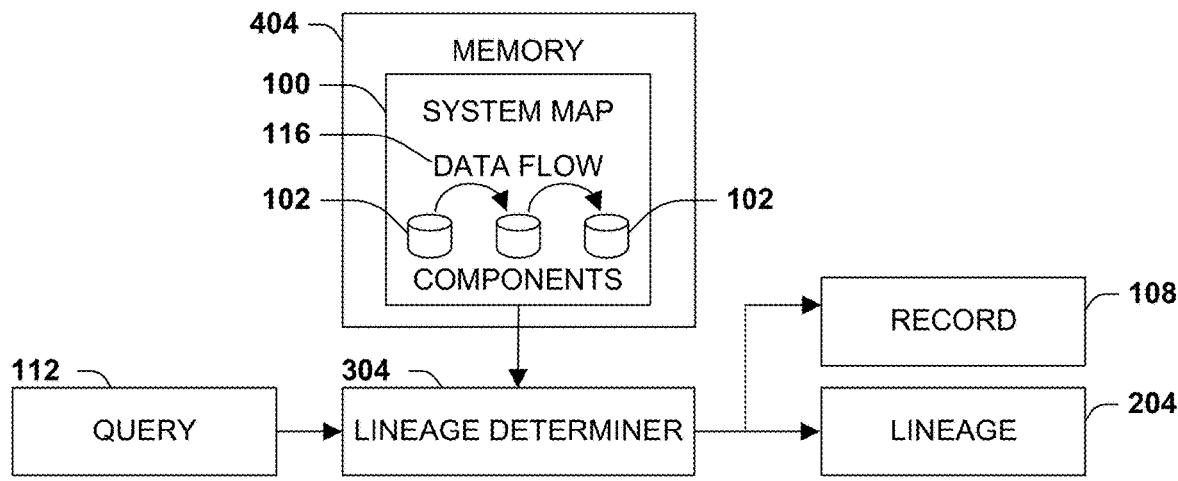
FIG. 7A is an illustration of an example lineage determiner that determines a data flow of a query and a lineage of a record, in accordance with some example embodiments.
Figure 7B:
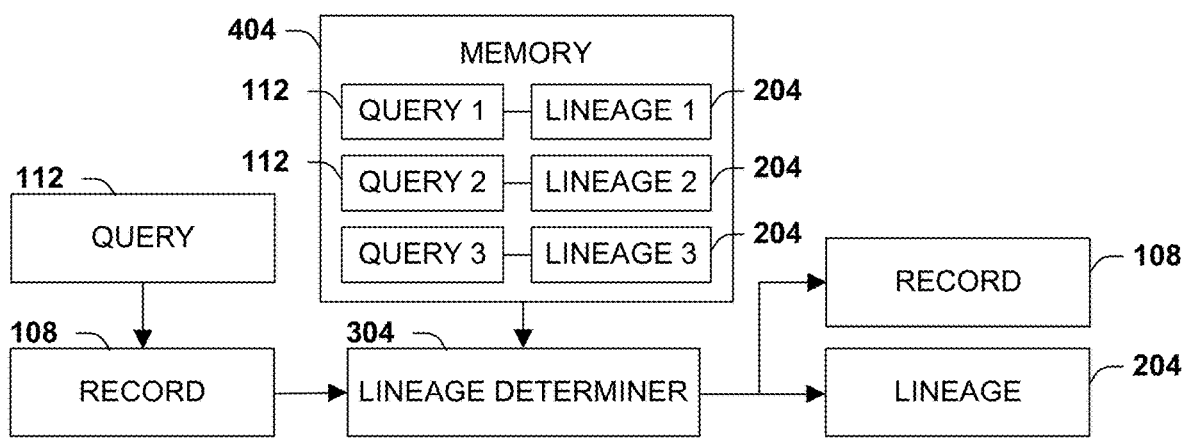
FIG. 7B is an illustration of another example lineage determiner that determines a data flow of a query and a lineage of a record, in accordance with some example embodiments.
Figure 7C:
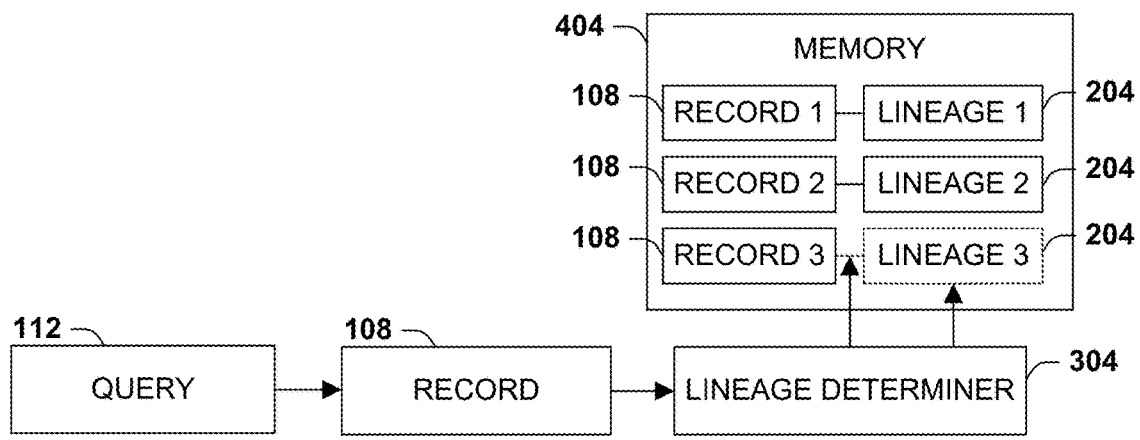
FIG. 7C is an illustration of another example lineage determiner that determines a data flow of a query and a lineage of a record, in accordance with some example embodiments.

FIGS. 7A-7C are illustrations of example lineage determiners 304 that determine a data flow 116 of a query 112 and/or a lineage 204 of a record 108, in accordance with some example embodiments.

As shown in FIG. 7A, a lineage determiner 304 may be configured to identify the plurality of components and the data flow by storing a system map 100 indicating the data flow 116, and may determine the lineage 204 of a record 108 by referring to the data flow 116 indicated by the system map 100. For example, the plurality of components 102 and the data flow 116 may be included in a system map 100 indicating a schema of the plurality of components 102. The system map 100 may be stored in a memory of an apparatus, such as the example apparatus 300 of FIG. 3 or the example apparatus 400 of FIG. 4, and/or on a non-transitory computer-readable storage medium 600, and/or may be accessible to such an apparatus, for example, over a network. The example lineage determiner 304 may identify the data flow 116 of a query 112, and also the lineage 204 of a record 108 generated by processing the query 112 through the components 102 according to the data flow 116, by referring to the schema indicated by the system map 100. For example, in response to receiving or processing a query 112 to be stored and/or evaluated, the lineage determiner 304 may examine the system map 100 to determine the data flow 116 through the components 102 by which the query 112 is to be processed to generate records 108, and may deduce the linage 204 of a record 108 thus generated.

As shown in FIG. 7B, a lineage determiner 304 may be configured to identify the plurality of components 102 and the data flow 116 by storing, in association with each query 112, the lineage 204 of records 108 generated by the query 112, and may determine the lineage 204 of a record 108 by referring to the lineage 204 stored in association with the query 112 in response to which the record 108 was generated. For example, a set of queries 112 may be stored in a memory 404 of an apparatus, such as the example apparatus 300 of FIG. 3 or the example apparatus 400 of FIG. 4, and/or on a non-transitory computer-readable storage medium 600, and/or may be accessible to such an apparatus, for example, over a network. Each query 112 may be associated with a lineage 204 that indicates the data flow 116 by which the query 112 is to be processed through the plurality of components 102 to generate records 108. For example, the lineage 204 may be stored when the query 112 is defined, stored, updated, or evaluated, and/or when the components 102 of the system map 100 and/or the resources stored thereby are created or altered. The lineages 204 may be stored together with the queries 112 in the memory 404 (e.g., as metadata) or may be stored separately from the queries 112. The lineage determiner 304 may therefore determine the lineage 204 of a record 108 that is generated in response to a query 108 by retrieving (e.g., from the memory 404) the lineage 204 associated with the query 112 and associating (e.g., attaching and/or annotating) the record 108 with the lineage 204 of the query 112.

As shown in FIG. 7C, a lineage determiner 304 may be configured to identify the plurality of components 102 and the data flow 116 by storing the lineage 204 of the record 108 that indicates the data flow from the first component to the second component, and may determine the lineage 204 of the record 108 by referring to the lineage 204 stored in association with the record 108. For example, a set of records 108 may be stored in a memory 404 in association with a lineage 204 of the record 108 based on the data flow 116 by which the query 112 was processed through the plurality of components 102 to generate the record 108. For example, the lineages 204 may be attached to each such record 108 (e.g., as metadata) or may be stored separately from the records 108 with an association therebetween. A lineage determiner 304 that receives a record 108 generated by a query 112 may determine the lineage 204 of the record 108 by retrieving (e.g., from the memory 404) the lineage 204 that is associated with the record 108.

In some example embodiments, an apparatus may be configured to determine the lineage 204 of a record 108 as part of a process of generating a record 108, such as determining the lineage 204 as part of evaluating a query 112 based on the data flow 116 to generate the record 108. In some example embodiments, an apparatus may determine the lineage 204 of a record 108 before initiating the process of generating the record 108, such as storing, in association with a query 112, the lineage 204 to be associated with any records 108 that are generated by the query 112 based on the data flow 116. In some example embodiments, an apparatus may determine the lineage 204 of a record 108 in response to a request for the lineage 204 of the record 108. For example, an apparatus may respond to such a request by identifying the plurality of components 102 and the data flow 116, such as a request to describe a record 108 or a query 112 whereby a record 108 has been or may be generated, and may be configured to refer to the determining in a response to the request, for example, as a description or compilation of the metadata of the records 108.

In some example embodiments, an apparatus may be configured to determine the lineages 204 of records 108 based on the components 102 and relationships thereamong reflected in a system map 100. In the event that the system map 100 is updated, the updated system map 100 may replace a previous system map 100, and the lineages 204 of records 108 may be updated to reflect the updated system map 100 (e.g., updating previously determined lineages 204, such as those that are associated with a query 112 or a record 108). In some example embodiments, in the event that the system map 100 is updated, a batch of updates to the system map 100 may be received by an apparatus and applied to the system map 100. The apparatus may then identify the plurality of components and the data flow 116 and/or the lineages of one or more records 108 by referring to the system map 100 including the batch of updates. In some such examples, an apparatus may receive a stream of updates to the system map 100, and may apply each update of the stream of updates to the system map 100. The apparatus may thus determine the lineage 204 of a record 108 by referring to the system map 100 that includes the updates of the stream.

In some example embodiments, an apparatus may be configured to determine the lineage 204 of a record 108 by describing the lineage 204 in a lineage language, such as Structured Query Language (SQL), Extensible Markup Language (XML), and/or JavaScript Object Notation (JSON), or a variant thereof, or in a natural language, or in a language that is custom-developed for describing the lineage 204. In some example embodiments, a set of lineages 204 may be represented together, for example, as a lineage map that shows the lineages 204 of a variety of records 108 generated by the components 102 of the system map 100. Many such variations may be included in the identification of data flows 116 of queries 112 and the determination of lineages 204 of records 108 by some example embodiments.

E3. Visual Depiction of Record Lineage

In some example embodiments, a lineage 204 of a record 108 that indicates the data flow 116 of the query 112 through at least a first component 102 and a second component 102 of a system map 102 to generate a record 108 may be included in a variety of visual depictions 200 for presentation to a user 308.

Figure 8:
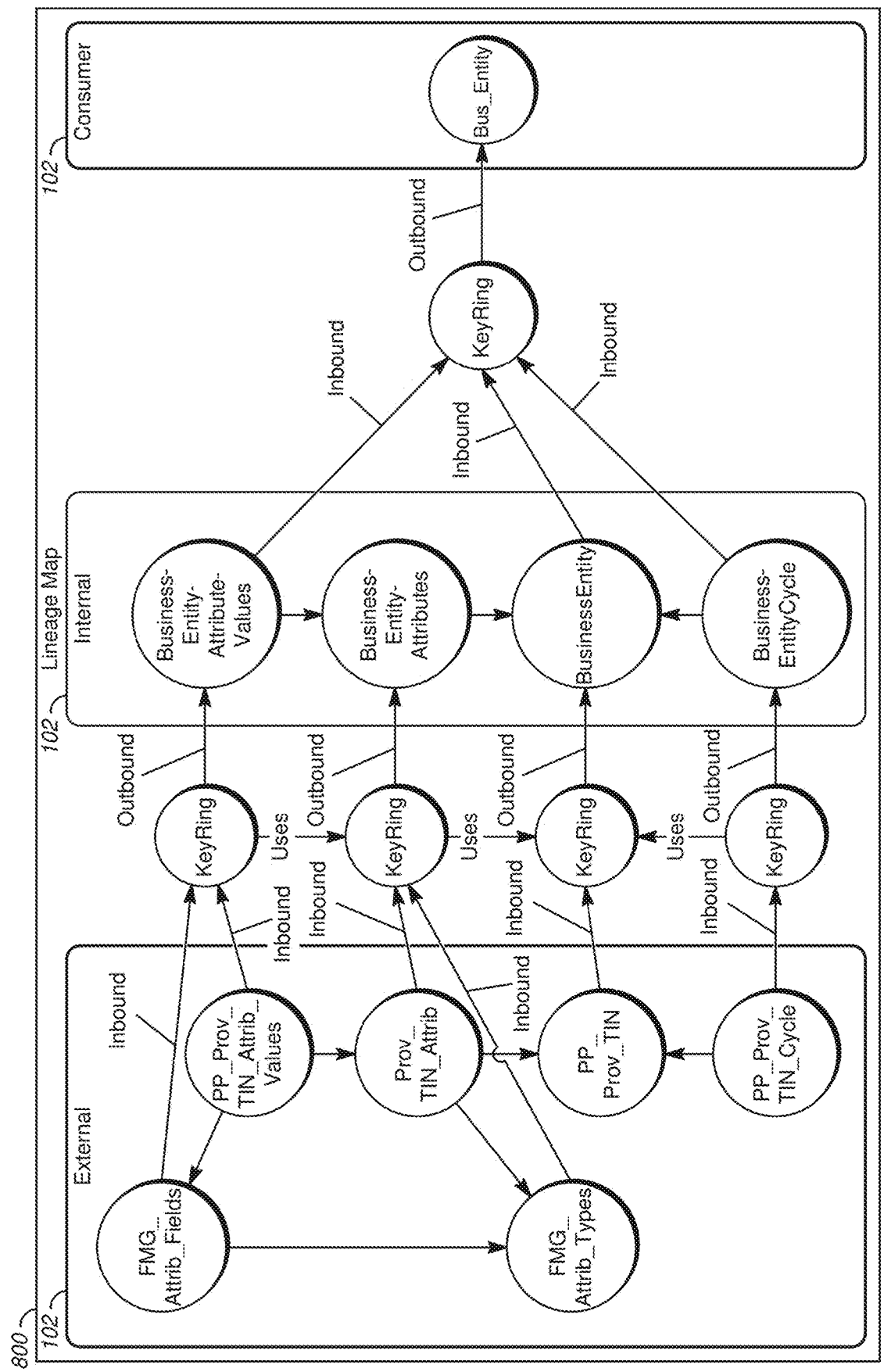
FIG. 8 is an illustration of an example lineage map that may be presented as a visual depiction of an example lineage of a record in accordance with some example embodiments

FIG. 8 is an illustration of an example lineage map 800 that may be presented as a visual depiction 200 of a lineage 204 of a record 108 in accordance with some example embodiments.

As shown in FIG. 8, the lineage map 800 may indicate a data flow 116 (including a direction) among a set of components 102 by which a query 112 may be processed and/or was processed to generate a record 108. In this example visual depiction 200, the visual depiction 200 is presented as a linear flow map including a linear axis that indicates a direction of the data flow 116, and the visual depiction may indicate the data flow 116 from the first component 102 to the second component 102 according to the direction indicated by the linear axis. That is, the components 102 are organized in a linear manner so that the data flow 116 is shown in a generally left-to-right orientation. The data flow 116 may indicate the interconnections of the components 102, and the lineage 204 may further indicate the data flow 116 from a first component to a second component, such as the transfer of data from an internal component 102 to an external component 102. A data flow 116 may begin at the left edge denoting the receipt of a query 112 by a first component 102, and may conclude at the right edge denoting the completion of processing and the presentation of one or more records 108 generated in response to the query 112. The lineage map 800 may indicate each component 102 that was used to generate the record 108, including the names of the resources (e.g., FMG_ATTRIB_TYPES) and interrelationships of the resources (e.g., the direction of foreign-key dependencies). The lineage map 800 may indicate transition points between components 102 in the data flow 116, such as a transfer of a partial query result from a first component 102 to a second component 102 (e.g., some records of a first table 106 of a first component 102 may be transmitted to a second component 102 to be joined with a second table 106 of the second component 102). In some example embodiments, the lineage map 800 may include additional information, such as data types and formats, constraints such as permissible ranges of values, and exposed properties and methods.

Figure 9:
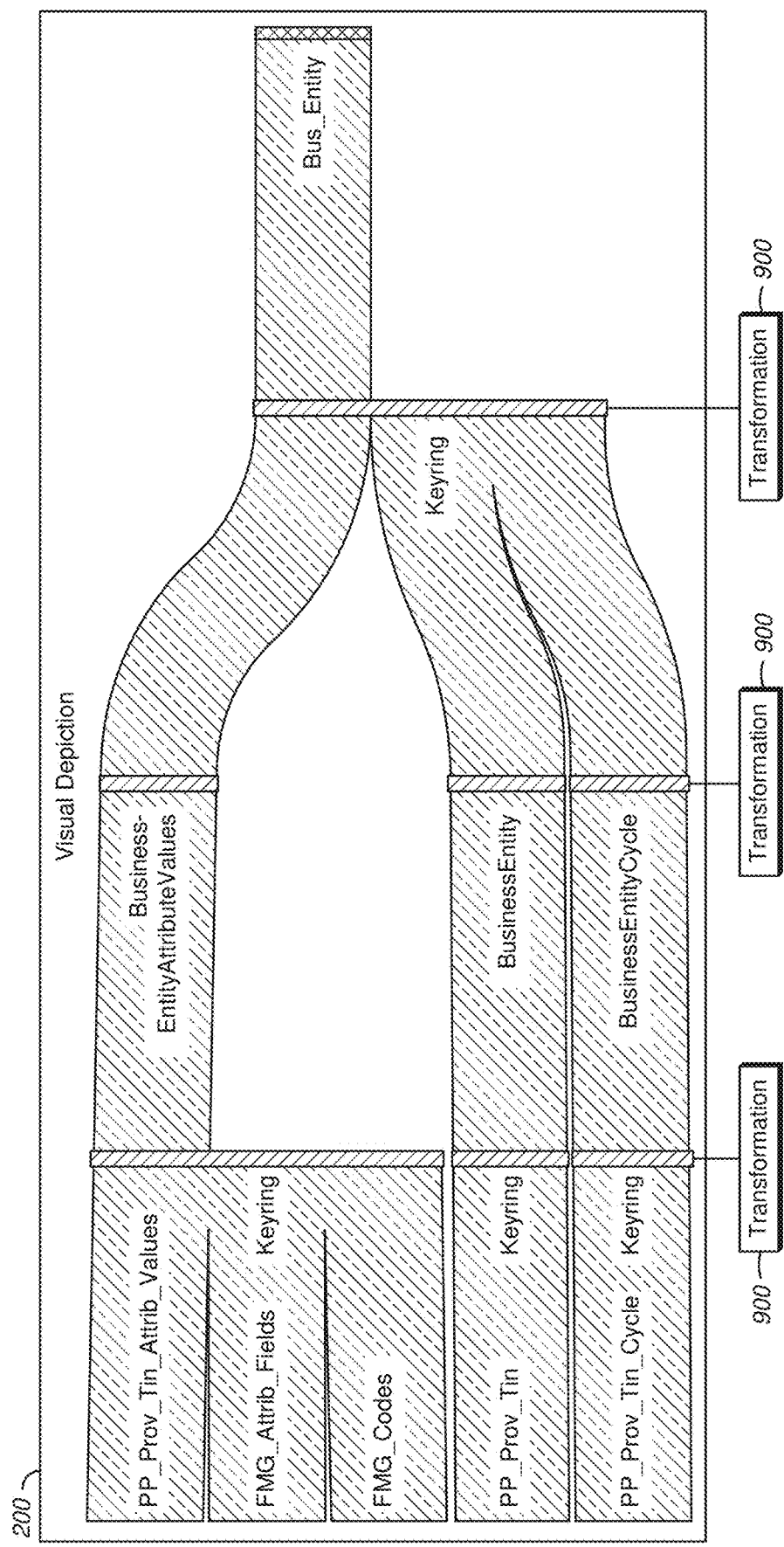
FIG. 9 is an illustration of an example visual depiction of a transformation, in accordance with some example embodiments.

FIG. 9 is an illustration of another example visual depiction 200 of a lineage map 800, in accordance with some example embodiments.

In this example visual depiction 200, the components 102 are organized in a linear manner so that the data flow 116 is shown in a generally left-to-right orientation. The data flow 116 may also include points at which the processing of a query 112 branches and/or merges. For example, a first component 102 may partially process the query 112, such as selecting a subset of records of a first table 106, and may send a first intermediate result (such as a first subset of the attributes 110 of the selected records) to a second component 102 that joins the records with attributes 110 from a second table 106 stored by the second component 102, and may also send a second intermediate result (such as a second subset of the attributes 110 of the selected records) to a third component 102 that joins the records with attributes 110 from a third table 106 stored by the third component 102. The second component 102 and the third component 102 may each transmit an intermediate result to a fourth component 102 that merges the intermediate results (optionally by joining with attributes 110 from a fourth table 106 stored by the fourth component 102) to generate the record 108.

As further shown in the example of FIG. 9, the visual depiction 200 of a lineage map 800 may include transformations 900 that may occur at various points in the data flow 116, such as transition points between components 102 and/or resources. A transformation 900 of the data may involve, for example, type or format conversion, value scaling, and/or object reversioning from a first version that is used by the first component 102 to a second version that is used by the second component 102. The visual depiction 200 may include a visual depiction of the transformations 900 in the data flow 116 to indicate the points at which data transformations occur, which may be informative, for example, to a user 308 who is interested in exploring the lineage 204 of a record 108 to determine how the record 108 was generated through the data flow 116.

Figure 10:
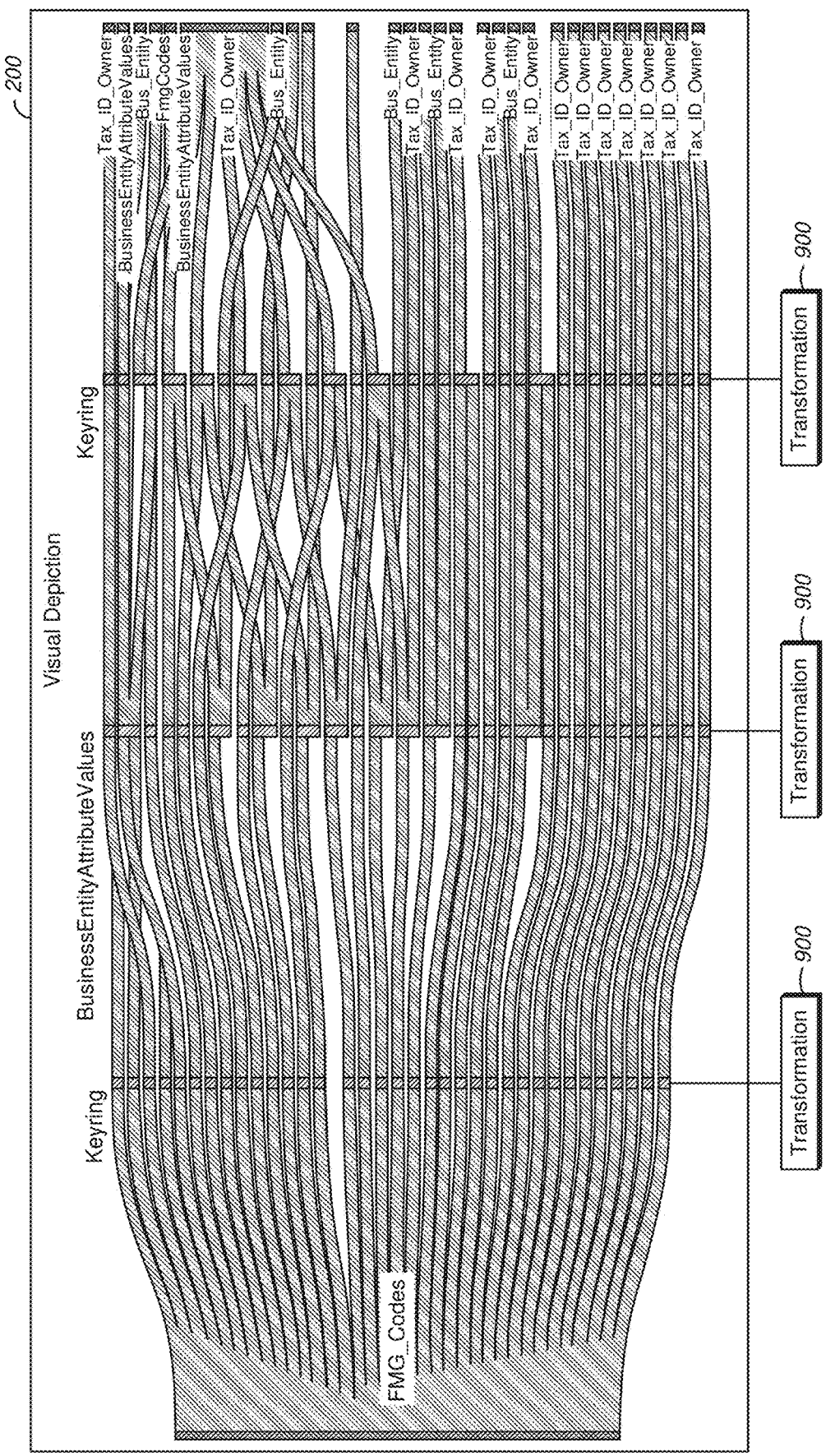
FIG. 10 is an illustration of another example visual depiction of a lineage map, in accordance with some example embodiments.

FIG. 10 is an illustration of another example visual depiction 200 of a lineage map 800, in accordance with some example embodiments.

As shown in FIG. 10, an example visual depiction 200 of a lineage map 800 may include a set of lineages 204 by which a set of records 108 may be generated through the processing of one or more queries 112 according to one or more data flows 116. In this example visual depiction 200, the components 102 are organized in a linear manner so that the data flow 116 is shown in a generally left-to-right orientation. As a first example, the lineage map 800 presented in the visual depiction 200 may be limited to the lineages 204 of records 108 that are generated by a query 112, which may result in the presentation of different records 108 to different components 102. As a second example, the lineage map 800 presented in the visual depiction 200 may be limited to the lineages 204 of records 108 in which a particular component 102 participates, for example, the set of queries 112 that are processed through the first component 102. As a third example, the lineage map 800 presented in the visual depiction 200 may be limited to the lineages 204 that involve a particular resource of a component 102, for example, a particular table 106, and/or that involve a particular selection of data, for example, the data of a particular patient represented in a healthcare system. For instance, an apparatus may present the visual depiction 200 by determining, for each component 102 included in the data flow 116, a set of resources that are involved in the lineage 204 of the record 108, and may present the visual depiction 200 of the set of resources of each component 102 that are involved in generating the record 108 (that is, limiting the visual depiction 200 to the resources involved in generating the record 108). As a fourth example, the lineage map 800 presented in the visual depiction 200 may be limited to the lineages 204 that involve a particular transformation 900, for example, a transfer of data from a first component 102 to a second component 102 and/or a transformation applied thereto.

Figure 11:
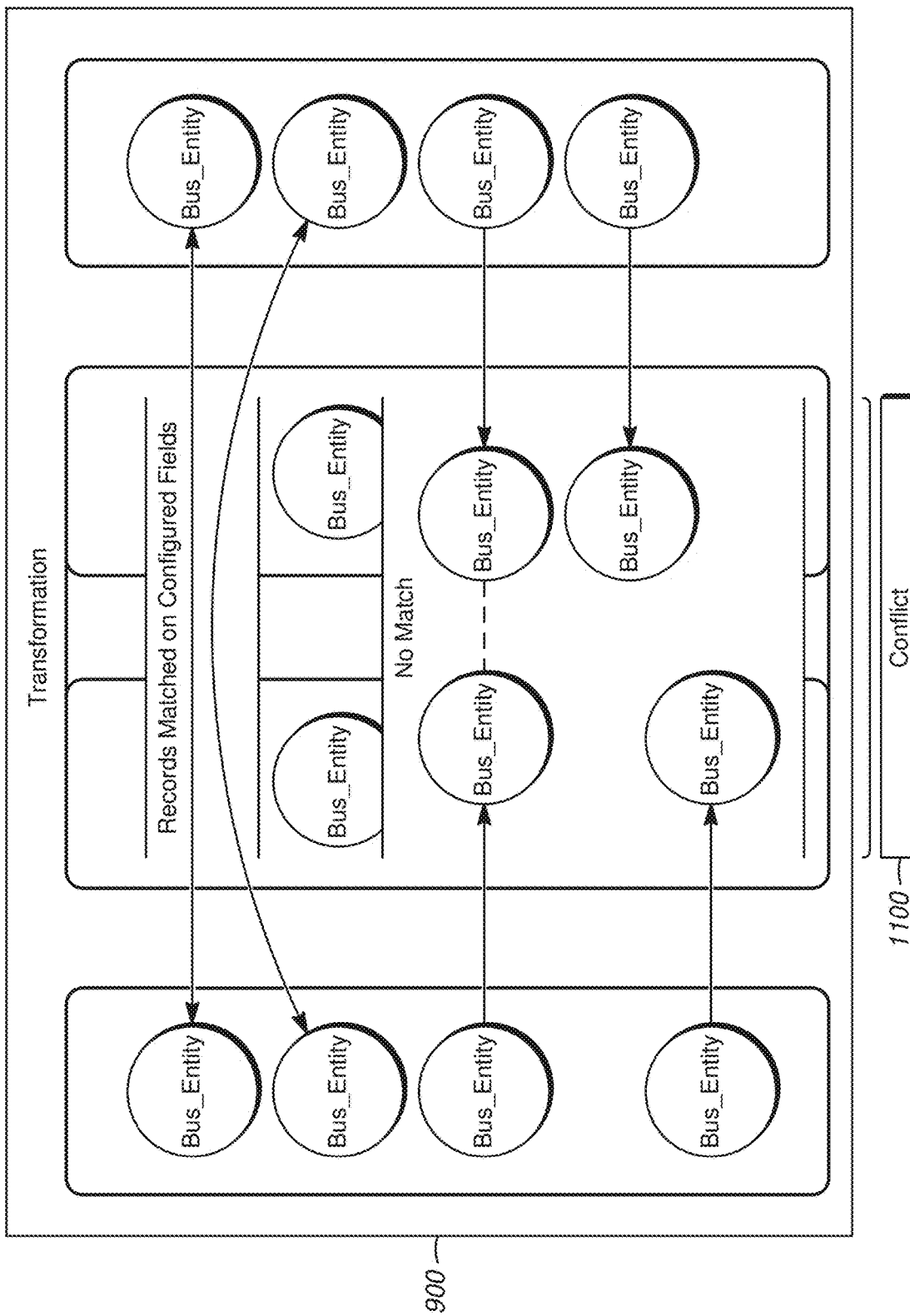
FIG. 11 is an illustration of an example visual depiction of a transformation, in accordance with some example embodiments.

FIG. 11 is an illustration of an example visual depiction of a transformation, in accordance with some example embodiments.

As shown in FIG. 11, a transformation 900 may involve a processing of data provided by a first component 102 to generate data that is usable by a second component 102. A transformation 900 may occur, for example, at a point in a data flow 116 involving a transmission of data from the first component 102 to the second component 102. The transformation 900 may be performed, for example, by the first component 102, the second component 102, an intermediary component 102 (not shown), or a combination of such components 102. As a first example, a transformation 102 may include evaluating a foreign-key relationship between a first table 106 stored by the first component 102 and a second table 106 stored by the second component 102, such as matching records 108 of the first table 106 that have a certain value in a foreign-key attribute 110 with records 108 of the second table 106 that have corresponding values of a key attribute 110 of the table (or vice versa). As a second example, a transformation 102 may include translating the format of values of a first attribute 110 in respective records 108 of the first table 106 stored by the first component 102 into a different format that is used by a corresponding attribute 110 in corresponding records 108 of a second table 106 stored by the second component 102.

As further shown in FIG. 11, in some cases, the transformation 900 may result in a conflict 1100 wherein the transformation 900 fails or is unable to be completed. As a first example, a matching of records 108 based on a foreign-key relationship may fail if a foreign-key value of a record 108 of a first table 106 does not match the key value of any record 108 of a second table 106. As a second example, format translation of a value of a record 108 of a first table 106 may fail if the value is not representable in the corresponding format of a second table 106. A conflict 1100 may also arise if a validation operation of the transformation 900 fails; for example, format translation may be successfully applied to each attribute 110 of a record 108 in transit from a first component 102 to a second component 102, but a holistic evaluation of the translated record 108 may reveal inconsistencies, for example, due to semantic differences between the uses of the attributes 110 and values by the first component 102 and the corresponding attributes 110 and values by the second component. In such cases, a conflict 1100 may arise, and may be depicted within a visual depiction 200 of the data flow 116.

E4. Visual Depiction Features

In some example embodiments, a visual depiction 200 of a data flow 116 by which a record 108 is generated in response to a query 112 based on a data flow 116 through a set of components 102 may include a variety of additional features.

As a first example, an apparatus may present visual depiction 200 of a data flow 116 to illustrate various aspects of a data set; that is, in response to various types of requests that may be received, for example, from a user 308. As a first such example, an apparatus may present a visual depiction 200 of the set of resources by initially presenting each component 102 without the set of resources; receiving a selection of a selected component 102 of the plurality of components 102; and updating the visual depiction 200 in response to the selection to include the set of resources of the selected component 102 that are involved in the lineage 204 of the record 108. As another example, a record may be included in a record set (e.g., a table 106), and an apparatus may receive a selection of the record 108 of the record set and may present the visual depiction 200 of the lineage 204 of the record 108 in response to the selection. As a third such example, a record 108 may be associated with a query 112 over the plurality of components 102, and an apparatus may receive (e.g., from a user) a selection of the query 112 and may present the visual depiction 200 of the lineage 204 of the record 108 that is associated with the query 112. As a fourth such example, an apparatus may receive a request to describe the plurality of components 102 and the data flow 116, and may present the visual depiction 200 of the lineage 204 of the record 108 in response to the request. As a fifth such example, a data flow from a first component 102 to a second component 102 may include a transformation 900 that transforms data transmitted by the first component 102 to data received by the second component 102, and an apparatus 102 may present a visual depiction 200 of a lineage 204 of a record 108 that includes the transformation 900. In some example embodiments, the apparatus may be configured to present a visual depiction of the transformation 900 that includes a presentation of the record 108 before and/or after the transformation 900.

Figure 12:
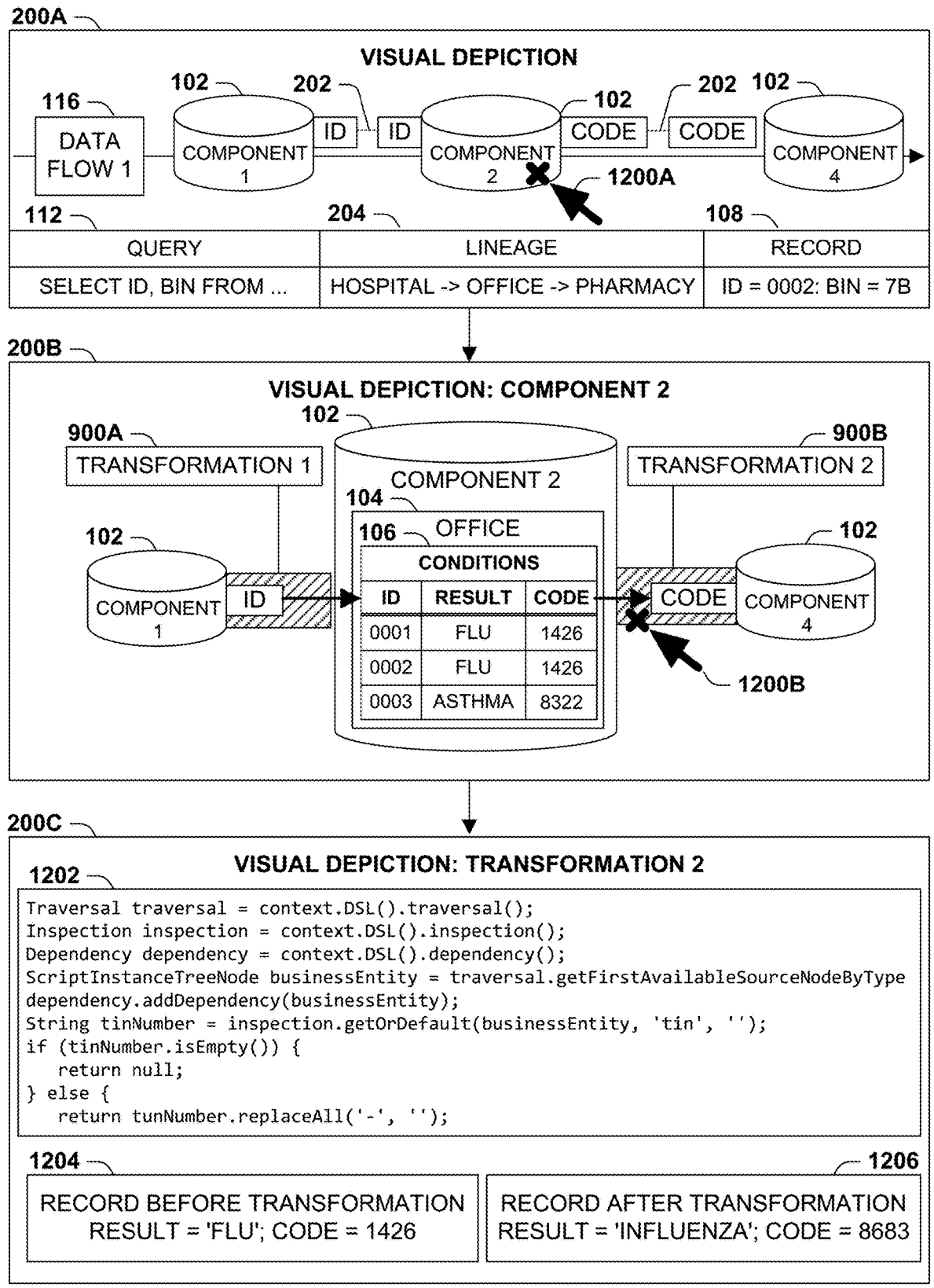
FIG. 12 is an illustration of another example visual depiction of a transformation, in accordance with some example embodiments.

FIG. 12 is an illustration of another example visual depiction of a transformation, in accordance with some example embodiments.

As shown in FIG. 12, some visual depictions 200A, 200B, 200C of a data flow 116 may include a set of components 102 that are involved in a processing of a query 112 according to the data flow 116, such that a user 308 may drill down into various features of the data flow 116 to view different aspects and/or different levels of detail.

As shown in FIG. 12, in a first visual depiction 200A, the components 102 are organized in a linear manner so that the data flow 116 is shown in a generally left-to-right orientation. The visual depiction 200A may include the query 112 (e.g., the code of the query 112 in a query language 114, such as SQL), the lineage 204 of a record 108 generated by the query 112, and the record 108 generated thereby, including a values of attributes 110 of the record 108. The visual depiction 200A may also depict associations 202 between the resources of the components 102 involved in the query 112, such as particular attributes 110 of tables 106 that are involved in one or more transformations 900 while intermediate query results are exchanged between components 102.

As further shown in FIG. 12, a first selection 1200A may occur within the first visual depiction 200A, such as a pointer selection of the second component 102 (e.g., a user 308 manipulating a mouse cursor to point to and select the second component 102, or a user 308 tapping on the second component 102 shown on a touch-sensitive display). In response, a second visual depiction 200B may be presented that provides more information about the second component 102 and its role in the data flow 116, such as the entity 104 that manages the second component 102; a table 106 stored by the second component 102 and involved in the processing of the query 112 by the data flow 116; the attributes 110 of the table 106; and/or the values of the records 108 for respective attributes 110 of the table 106. The second visual depiction 200B may also include information about the interaction of the second component 102 with the other components 102, such as a first transformation 900A that is performed while receiving a first intermediate query result from the first component 102 and a second transformation 900B that is performed while transmitting a second intermediate query result to the fourth component 102.

As further shown in FIG. 12, a second selection 1200B may occur within the second visual depiction 200B, such as a pointer selection of the second transformation 900B. In response, a third visual depiction 200C may be presented that provides more information about the second transformation 900B, such as the transformation code 1202 (e.g., statements in a language such as JavaScript) by which data provided by the second component 102 is transformed for transmission to the fourth component 102. The third visual depiction 200C may include, for example, a depiction 1204 of the record 108 before the second transformation 900B and/or a depiction 1206 of the record 108 after the second transformation 900B, which may inform a user 308 who wishes to understand the manner by which a record 108 is generated by processing a query 112 according to a data flow 116. In this manner, the stepwise visual depictions 200A, 200B, 200C of the data flow 116 may provide a responsive, well-organized presentation of the details of the data flow 116 in accordance with some example embodiments.

As a second such example, an apparatus may be configured to enable a user 308 to manipulate a visual depiction 200 of the components 102 of a system map 100. For example, an apparatus may be configured to receive a request to filter the visual depiction 200 based on a filter criterion and to identify, from the plurality of components 102, a set of resources that satisfy the filter criterion. The apparatus may be configured to present a visual depiction 200 of the lineage 204 of the record 102 that is limited to the set of resources that satisfy the filter criterion.

As a third such example, an apparatus may be configured to enable a user (such as an individual or a process) to apply a logical test to data involved in a transformation 900. A transformation 900 occurring in a data flow 116 between a first component 102 and a second component 102 may include a test involving the transformation 900, for example, a validation of the transformed data to detect a conflict 1100. An apparatus may be configured to receive a test involving the data flow 116 including the transformation 900 and to apply the test to the record 108 generated by the plurality of components 102 based on the data flow 116 to generate a test result, such as a pass/fail indicator or a description of a conflict 1100 such as the details of a validation failure. For example, the apparatus may be configured to receive the test from a user 308 such as an administrator who wishes to evaluate a logical feature of the data involved in the transformation 900. The apparatus may be configured to present a visual depiction 200 of the test result of the test, for example, as part of a visual depiction of the data flow 116.

As a fourth example, an apparatus may be configured to enable a user 308 to create and/or update a transformation 900 within a data flow 166. For example, an apparatus may be configured to receive a request to create or update a transformation 900 included in the data flow 116 between a first component 102 and a second component 102, where the transformation 900 transforms data received from the first component 102 to data received by the second component 102. The apparatus may be configured to create or update the transformation included in the data flow 116 in response to the request.

As a fifth example, an apparatus may be configured to indicate, within a visual depiction 200 of a data flow 116, a conflict 1100 that may arise with respect to a transformation 900. As a first such example, an apparatus may be configured to identify, in the data flow 116, a conflict 1100 between data transmitted by a first component 102 and data received by a second component 102. The apparatus may be configured to present, within a visual depiction 200 of the data flow 116, a visual depiction of the conflict 1100. The visual depiction 200 of the conflict 1100 may be positioned, for example, between the first component 102 and the second component 102 in the visual depiction 200 of the data flow 116. As a second such example, a data flow 116 may be associated with a query 112 that is also associated with another data flow 116 that differently interconnects the plurality of components 102 based on the another data flow 116 (for example, the first data flow 116A in FIG. 2A and the second data flow 116B in FIG. 2B). The apparatus may be configured to identify a conflict based on difference between the record 108 produced by the data flow 116 and another record 108 produced by the another data flow 116 (e.g., a determination that the values or structure of the records 108 unexpectedly differ). The apparatus may be configured to present a visual depiction 200 of the lineage 204 of the record 108 that includes a visual depiction of the conflict 1100.

As a sixth example, an apparatus that identifies a conflict 1100 arising with respect to a data flow 116 may further alert a user 308 (such as an individual or an automated process). For example, when a data flow 116 is associated with a conflict 1100, an apparatus may be configured to determine the conflict 11900 that is associated with the data flow 116 and to present, to a user, an alert involving the conflict 1100 associated with the data flow 116. The alert may include, for example, highlighting a portion of a visual depiction 200; sending a signal or message, such an email or text message; creating an entry in a log; or invoking a conflict resolution process. Many such features may be included in a visual depiction 200 in some example embodiments.

E5. Visual Depiction of Changes to Components or Data Flow

In some example scenarios, a user 308 (such as an individual) may wish to understand how changes to a plurality of components 102, and/or to data flows 116 within the plurality of components 102, may affect the lineage 204 of records 108 generated in response to queries 112 based upon the data flows 116. Such consideration may be retroactive (e.g., describing for a user 308 how an applied change has affected the processing of queries 112); prospective (e.g., enabling a user 308 to experiment with such changes and to predict, simulate, and/or explain such changes); and/or suggestive (e.g., notifying a user 308 how a change may improve, degrade, enable, prevent, alter, and/or affect the processing of queries 112).

For example, an apparatus may be configured to enable a user 308 to explore the functionality of a system map 100 of a plurality components 102 and the data flows 116 and records 108 arising therein based upon changes to the system map 100. For example, a user 308 may wish to explore how such the processing of such queries 112 might be affected by a change to the system map 100, such as adding one or more components 102, creating or provisioning resources on one or more components 102 to the system map 100, moving data or resources (such as a table 106 of the data set) from one component 102 to another component 102, distributing data or resources over two or more components 102, consolidate data or resources from a plurality of components 102 to a smaller number of components 102, and/or removing one or more components 102 from the system map 100. The user may also consider altering the logical schema of the data set, such as creating, updating, altering, and/or deleting one or more tables 106 or the records 108 contained therein. The user may also consider altering one or more data flows 116 by which one or more queries 112 are processed, such as creating a new data flow 116 through the components 102 of the system map 100 by which a query 112 may be processed and/or changing the processing of a query 112 from a first data flow 116A to a second data flow 116B. Such consideration may be retroactive (e.g., describing how an applied change has affected the processing of queries 112); prospective (e.g., enabling a user 308 to experiment with such changes and to predict, simulate, and/or explain such changes); and/or suggestive (e.g., notifying a user how a change may improve, degrade, enable, prevent, alter, and/or affect the processing of queries 112). An apparatus may be configured to determine a change in the plurality of components 102 or the data flow 116, and to determine a change in the lineage 204 of a record 108 based on the change in the plurality of components 102 or the data flow 116. The apparatus may be further configured to present a visual depiction 200 of the change in the lineage 204 of the record 108 in the visual depiction 200 of the system map 100.

As a first such example, a change to the plurality of components 102 may include adding a third component 102 that is included in a data flow 116. An apparatus may be configured to determine a change in the lineage 204 of a record 108 based on adding the third component 102 in the data flow 116, and to present presenting a visual depiction 200 of the plurality of components 102 that includes the change in the lineage 204 of the record 108 based on including the third component 102 in the data flow 116.

As a second such example, a change to the plurality of components 102 may include substituting a third component 102 for one of a first component 102 and a second component in a data flow (that is, changing the data flow 116 to involve the third component 102 rather than the first component 102 and/or the second component 102). An apparatus may be configured to determine the change in the lineage 204 of a record 108 based on the substitution of the third component 102 in the data flow 116, and to present, within the visual depiction 200 of the plurality of components 102, the change in the lineage 204 of the record 108 based on the substitution of the third component 102 in the data flow 116.

As a third such example, a change in the plurality of components 102 or the data flow 116 may result in a change in a key performance indicator of the data flow 116 indicated by the lineage 204 of a record 108, for example, an amount of data included in a record 108 or in a transfer of data among two or more components; a data rate among two or more components 102; and/or a volume of queries 112 and/or records 108 that may be processed by a set of components 102 using a data flow 116. An apparatus may be configured to present, within a visual depiction 200 of the plurality of components 102, a visual depiction of the change in the key performance indicator of the data flow 116.

As a fourth such example, an apparatus may be configured to enable a user 308 in addressing a conflict 1100 or a change in a key performance indicator due to a change in a set of components 102. That is, the apparatus may be able to advise the user 308 as to the manner of reconciling a data flow 116 that may be involved in a conflict 1100 (e.g., by creating or updating a transformation 900) and/or arising as a result of a change in a key performance indicator (e.g., by further updating the set of components 102 or data flows 116, such as re-routing one or more data flows 116 to use different components 102 and/or resources). An apparatus may be configured to determine a reconciliation of a data flow 116 between a first component 102 and a second component 102 based on the change in the plurality of components 102 or the data flow 116, and to present, within a visual depiction 200 of the lineage 204 of a record 108 based on the data flow 116, a visual depiction of the reconciliation of a data flow 116 between the first component 102 and the second component 102.

Figure 13A:
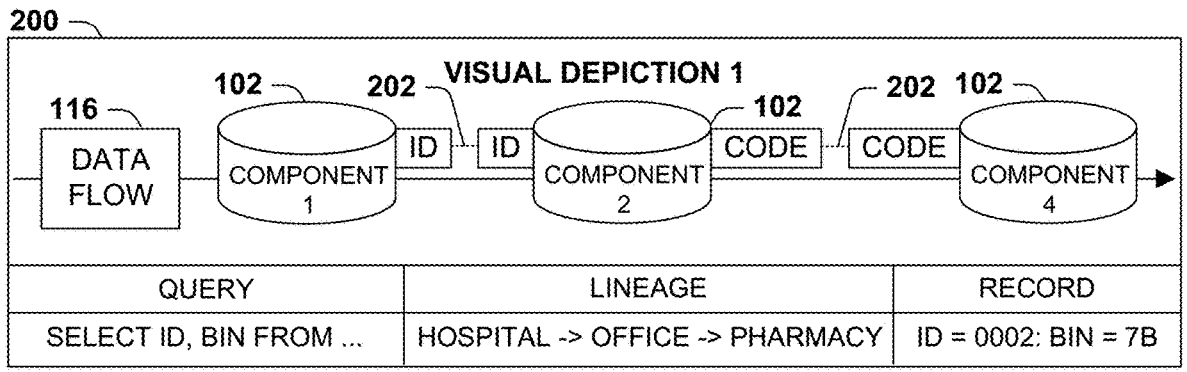
FIG. 13A is an illustration of another example visual depiction of a data flow, in accordance with some example embodiments.
Figure 13B:
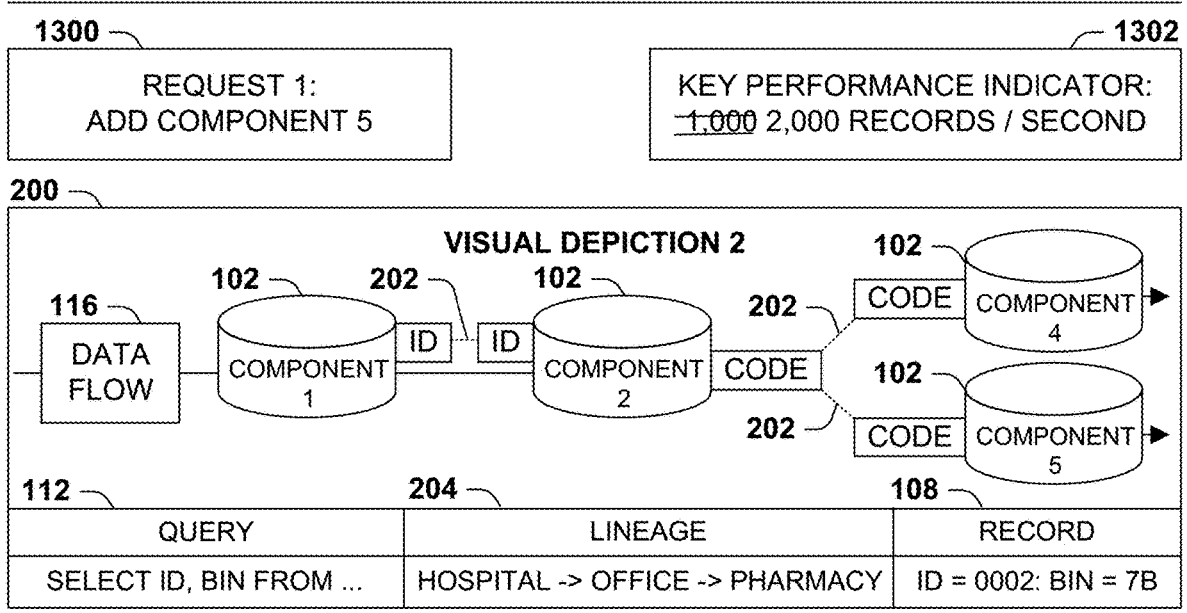
FIG. 13B is an illustration of another example visual depiction of a data flow, in accordance with some example embodiments.
Figure 13C:
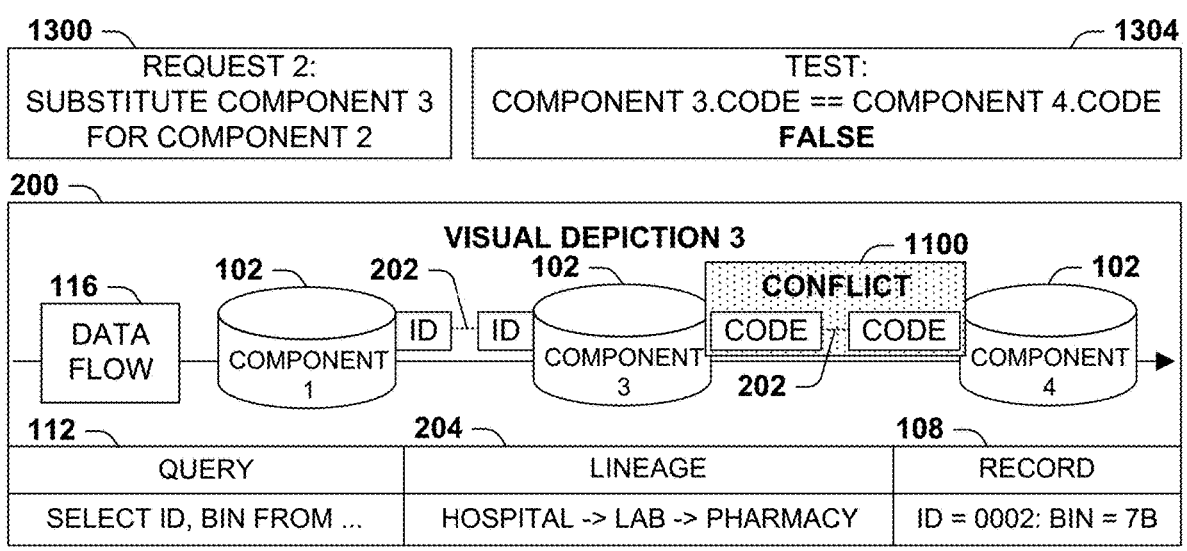
FIG. 13C is an illustration of another example visual depiction of a data flow, in accordance with some example embodiments.

FIGS. 13A-13C are illustrations of example visual depictions 200 of data flows 116 in response to changes to a plurality of components 102, in accordance with some example embodiments.

As shown in FIG. 13A, an apparatus may be configured to generate and present to a user 308 an initial visual depiction 200 may illustrate an initial state of a plurality of components 102, including a data flow 116 that interconnects a first component 102 and a second component 102 (e.g., by a first association 202) and that also interconnects a second component 102 and a third component 102 (e.g., by a second association 202). The initial visual depiction 200 may include a depiction of a query 112, a lineage 204 of a record 108 generated by processing the query 112 according to a data flow 116, and/or values of attributes 110 of the record 108.

As shown in FIG. 13B, a first request 1300 may be received (e.g., from the user 308) to add a fifth component 102 to the plurality of components 102 that are involved in a data flow 116. An apparatus may be configured to update the visual depiction 200 to indicate the inclusion of the fifth components 102 in the data flow 116. Additionally, the apparatus may be configured to determine a change to a key performance indicator 1302 based on the change that includes the fifth component 102 in the plurality of components 102, for example, determining that the addition of the fifth component 102 may increase the number of records 108 processed per second from 1,000 to 2,000. Accordingly, the apparatus may be configured to update the visual depiction 200 to indicate the change to the key performance indicator 1302 as a result of the change to the plurality of components 102.

As shown in FIG. 13C, a second request 1300 may be received (e.g., from the user 308) to substitute a third component 102 for a second component 102 in the plurality of components 102 (e.g., to change the data flow 116 from a first data flow 116A as shown in FIG. 2B to a second data flow 116B as shown in FIG. 2C). An apparatus may be configured to evaluate the change to the data flow 116, and may therefore detect a conflict 1100 arising in the data flow 116 following the change in the plurality of components 102. For example, the apparatus may be configured to detect the conflict 1100 by comparing the record 108 produced by the data flow 116 before the change to the record 108 produced by the data flow 116 after the change, where the record 108 is not expected to vary. As another example, the apparatus may be configured to detect the conflict 1100 by performing a validation of a record 108 generated by the query 112 processed by the data flow 116 after the change and determining a validation failure of the record 108. In such cases, the apparatus may be configured to update the visual depiction 200 to include a visual depiction of the conflict 1100 based on the change in the plurality of components 102. In this manner, the apparatus may enable the user 308 to explore the effects of changes to the set of components 102 through the presentation of the visual depiction 200, in accordance with some example embodiments.

F. Example Computing Environment

Figure 14:
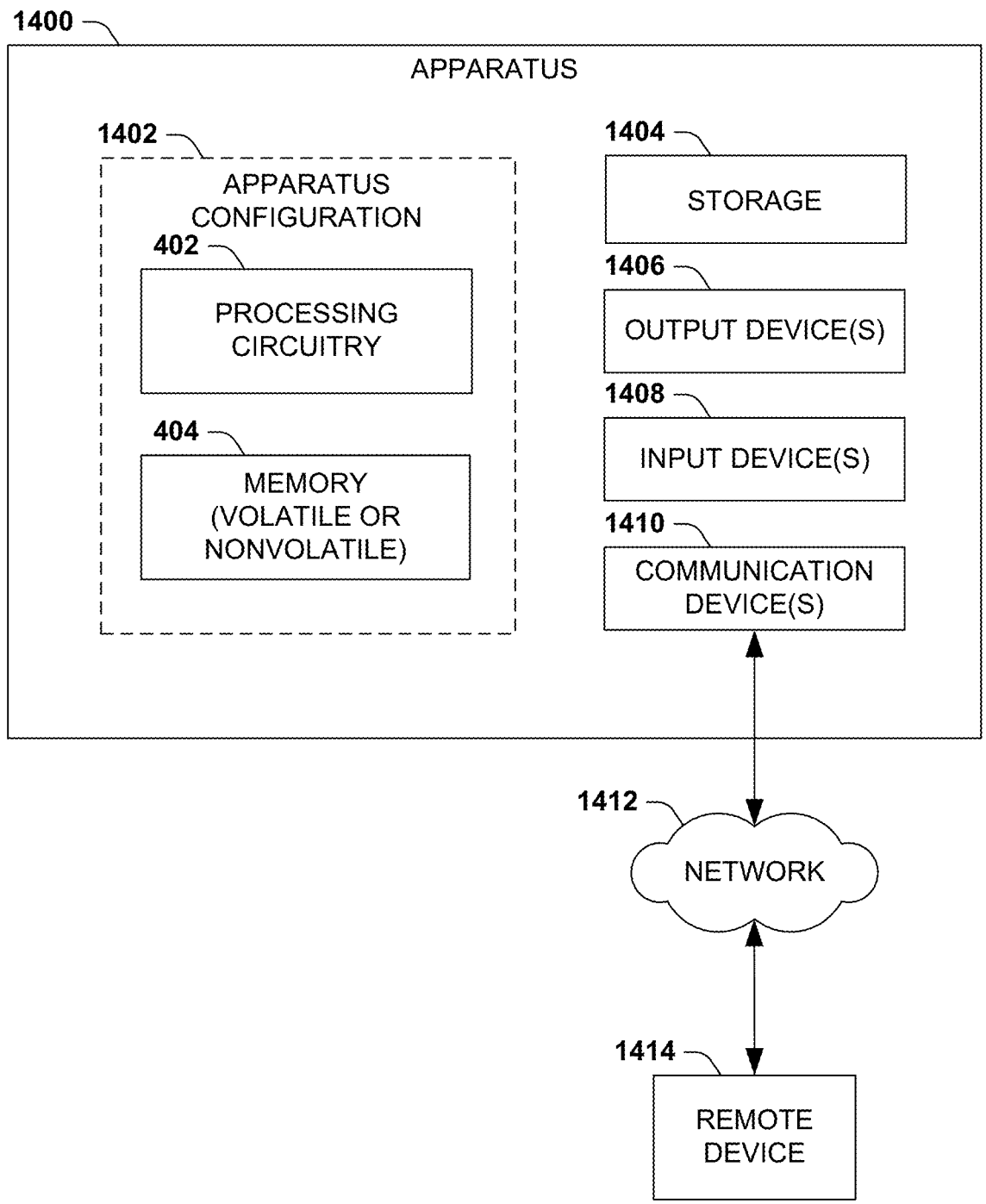
FIG. 14 is a component block diagram of another example apparatus, in accordance with some example embodiments.

FIG. 14 and the following discussion provide a brief, general description of a suitable computing environment to implement embodiments of one or more of the provisions set forth herein. The operating environment of FIG. 14 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 14 illustrates an example of an apparatus configured as, or to include, one or more embodiments, such as the example embodiments provided herein. In one apparatus configuration 1402, the apparatus 1400 may include processing circuitry 402 and memory 404. Depending on the exact configuration and type of computing device, memory 404 may be volatile (such as RAM, for example), nonvolatile (such as ROM, flash memory, etc., for example) or some combination of the two.

In some example embodiments, an apparatus 1400 may include additional features and/or functionality. For example, an apparatus 1400 may also include additional storage (e.g., removable and/or non-removable) including, but not limited to, magnetic storage, optical storage, and the like. Such additional storage is illustrated in FIG. 14 by storage 1404. In some example embodiments, computer-readable instructions to implement one or more embodiments provided herein may be stored in the memory 404 and/or the storage 1404.

In some example embodiments, the storage 1404 may be configured to store other computer readable instructions to implement an operating system, an application program, and the like. Computer-readable instructions may be loaded in memory 404 for execution by processing circuitry 402, for example. Storage may include volatile and nonvolatile, removable and non-removable media implemented in any method or technology for storage of information such as computer readable instructions or other data. Storage may include, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which can be accessed by apparatus 1400. Any such computer storage media may be part of apparatus 1400.

In some example embodiments, an apparatus 1400 may include input device(s) 1414 such as keyboard, mouse, pen, voice input device, touch input device, infrared cameras, video input devices, and/or any other input device. Output device(s) 1412 such as one or more displays, speakers, printers, and/or any other output device may also be included in device 1402. Input device(s) 1414 and output device(s) 1412 may be connected to device 1402 via a wired connection, wireless connection, or any combination thereof. In one embodiment, an input device or an output device from another computing device may be used as input device(s) 1414 or output device(s) 1412 for computing device 1402.

In some example embodiments, an apparatus 1400 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of an apparatus 1400 may be interconnected by a network. For example, memory 404 may be comprised of multiple physical memory units located in different physical locations interconnected by a network.

In some example embodiments, an apparatus 1400 may include one or more communication device(s) 1410 by which the apparatus 1400 may communicate with other devices. Communication device(s) 1410 may include, for example, a modem, a Network Interface Card (NIC), an integrated network interface, a radio frequency transmitter/receiver, an infrared port, a USB connection, or other interfaces for connecting the apparatus 1400 to other computing devices, including remote devices 1414. Communication device(s) 1410 may include a wired connection or a wireless connection. Communication device(s) 1410 may be configured to transmit and/or receive communication media.

Those skilled in the art will realize that storage devices used to store computer readable instructions may be distributed across a network. For example, an apparatus 1400 may communicate with a remote device 1414 via a network 1412 to store and/or retrieve computer-readable instructions to implement one or more example embodiments provided herein. For example, an apparatus 1400 may be configured to access a remote device 1414 to download a part or all of the computer-readable instructions for execution. Alternatively, an apparatus 1400 may be configured to download portions of the computer-readable instructions as needed, wherein some instructions may be executed at or by the apparatus 1400 and some other instructions may be executed at or by the remote device 1414.

In this application, including the definitions below, the term "module" or the term "controller" may be replaced with the term "circuit." The term "module" may refer to, be part of, or include processing circuitry 402 (shared, dedicated, or group) that executes code and memory hardware (shared, dedicated, or group) that stores code executed by the processing circuitry 402.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processing circuitry 402 may encompass a single microprocessor that executes some or all code from multiple modules. Group processing circuitry 402 may encompass a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The example embodiments of apparatuses and methods described herein may be partially or fully implemented by a special-purpose computer created by configuring a general purpose computer to execute one or more particular functions embodied in computer programs. The functional blocks and flowchart elements described herein may serve as software specifications, which may be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

G. Conclusion and Use of Terms

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

Although the subject matter has been described in language specific to structural features and/or methodological acts, the subject matter defined in the appended claims is not necessarily limited to the specific features or acts described above. Rather, the specific features and acts described above are disclosed as example forms of implementing the claims.

As used herein, the terms "component," "module," "system," "interface," and the like are generally intended to refer to a computer-related entity—either hardware, a combination of hardware and software, software, or software in execution. For example, a component may be, but is not limited to being, a process running on processing circuitry 402, processing circuitry 402, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, some example embodiments may include a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, not all operations are necessarily present in each embodiment provided herein.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. The articles "a" and "an" as used herein and in the appended claims may generally be construed to mean "one or more" unless specified otherwise or clear from context to be directed to a singular form.

Although the disclosure has been shown and described with respect to some example embodiments, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated some example embodiments of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. An apparatus comprising:
   processing circuitry; and
   a memory storing instructions that, when executed by the processing circuitry, cause the apparatus to:
   identify:
      a plurality of components;
      a first data flow, for a query, that interconnects a first set of the plurality of components and results in a first record responsive to the query; and
      a second data flow, for the same query, that interconnects a second set of the plurality of components and results in a second record responsive to the same query,
      wherein the second set includes at least one component that is absent from the first set, and
      wherein the first and second records are distinct;
   determine:
      a first lineage of the first record based on the query according to the first data flow of the query through the first set of the plurality of components, wherein the first lineage indicates the first data flow among the first set of the plurality of components and a data transformation among the first set that generates the first record, and
      a second lineage of the second record based on the query according to the second data flow of the query through the second set, wherein the second lineage indicates a second data flow among the second set and another data transformation among the second set that generates the second record; and
   present, to a user, a visual depiction of:
      the first lineage representing the first data flow through the first set,
      the second lineage representing the second data flow through the second set,
      the first record corresponding to the first lineage, and
      the second record corresponding to the second lineage.

2. A non-transitory computer-readable medium storing instructions that, when executed by processing circuitry of an apparatus, cause the apparatus to:
   identify:
      a plurality of components;
      a first data flow, for a query, that interconnects a first set of the plurality of components and results in a first record responsive to the query; and
      a second data flow, of the same query, that interconnects a second set of the plurality of components and results in a second record responsive to the same query,
      wherein the second set includes at least one component that is absent from the first set, and
      wherein the first and second records are distinct;

determine:
  a first lineage of the first record based on the query according to the first data flow of the query through the first set of the plurality of components, wherein the first lineage indicates the first data flow among the first set of the plurality of components and a data transformation among the first set that generates the first record; and
  a second lineage of the second record based on the query according to the second data flow of the query through the second set, wherein the second lineage indicates the second data flow among the second set and another data transformation among the second set that generates the second record; and
present, to a user, a visual depiction of:
  the first lineage representing the first data flow through the first set,
  the second lineage representing the second data flow through the second set,
  the first record corresponding to the first lineage, and
  the second record corresponding to the second lineage.

3. A method comprising:
executing, by processing circuitry of an apparatus, instructions that cause the apparatus to:
  identify:
    a plurality of components,
    a first data flow, for a query, that interconnects a first set of the plurality of components and results in a first record responsive to the query, and
    a second data flow, of the same query, that interconnects a second set of the plurality of components and results in a second record responsive to the same query,
    wherein the second set includes at least one component that is absent from the first set, and
    wherein the first and second records are distinct;
  determine:
    a first lineage of the first record based on the query according to the first data flow of the query through the first set of the plurality of components, wherein the first lineage indicates the first data flow among the first set of the plurality of components and a data transformation among the first set that generates the first record, and
    a second lineage of the second record based on the query according to the second data flow of the query through the second set, wherein the second lineage indicates the second data flow among the second set and another data transformation among the second set that generates the second record; and
  present, to a user, a visual depiction of:
    the first representing the first data flow through the first set,
    the second lineage representing the second data flow through the second set,
    the first record corresponding to the first lineage, and
    the second record corresponding to the second lineage.

4. The method of claim 3, wherein:
the instructions further cause the apparatus to store a system map indicating a schema of the plurality of components, and
determining the first lineage and the second lineage based on the query includes referring to the schema indicated by the system map to determine the first lineage of the first record and the second lineage of the second record.

5. The method of claim 3, wherein:
the instructions further cause the apparatus to store a system map indicating the first and second data flows, and
determining the first lineage and the second lineage based on the query includes referring to the first and second data flows indicated by the system map to determine the first lineage of the first record and the second lineage of the second record.

6. The method of claim 3, wherein:
the instructions further cause the apparatus to store the first lineage of the first record that indicates the first data flow of the query through the first set, and
determining the first lineage of the first record based on the query includes referring to the first lineage stored in association with the first record.

7. The method of claim 3, wherein identifying the plurality of components and the first and second data flows of the query is performed in response to a request for one of the first lineage or the second lineage.

8. The method of claim 3, wherein:
identifying the plurality of components and the first and second data flows of the query includes:
  receiving one or more updates to a system map, and applying the one or more updates to the system map, and
  determining one of the first lineage and the second lineage based on the query includes referring to the system map including the one or more updates.

9. The method of claim 3, wherein executing the instructions further causes the apparatus to generate a lineage map that indicates the first lineage of the first record based on the query, the lineage map specified in a lineage language.

10. The method of claim 3, wherein presenting the visual depiction includes:
  generating a linear flow map including a linear axis that indicates a direction of the first data flow of the first query, and
  representing the first data flow of the query through the first set in the direction indicated by the linear axis.

11. The method of claim 3, wherein presenting the visual depiction includes:
  determining, for each component of the first set included in the first data flow, a set of resources that are involved in the first lineage of the first record, and
  representing the set of resources of each component that are involved in generating the first record as part of the visual depiction.

12. The method of claim 11, wherein presenting the visual depiction includes:
  initially presenting each component without the set of resources,
  receiving a selection of a selected component of the plurality of components, and
  updating the visual depiction in response to the selection to include the set of resources of the selected component that are involved in the first lineage of the first record.

13. The method of claim 3, wherein:
the first record is included in a record set, and
presenting the visual depiction of the first lineage of the first record includes:
  receiving a selection of the first record of the record set, and
  presenting the visual depiction in response to the selection.

14. The method of claim 3, wherein presenting the visual depiction of the first lineage of the first record includes:
receiving a request to describe the plurality of components in the first set and the first data flow of the query, and
presenting the visual depiction of the first lineage of the first record based on the query in response to the request.

15. The method of claim 3, wherein:
the data transformation occurs when data is transmitted by a first component of the first set to a second component of the first set,
the first lineage of the first record includes the data transformation, and
presenting the visual depiction of the first lineage of the first record based on the query includes presenting a visual depiction of the data transformation between the first component and the second component.

16. The method of claim 15, wherein presenting the visual depiction of the data transformation includes presenting the first record before or after the data transformation.

17. The method of claim 15, wherein:
executing the instructions further causes the apparatus to:
receive a test involving the first data flow including the data transformation, and
apply the test to the first record generated by the plurality of components based on the first data flow to generate a test result, and
presenting the visual depiction of the data transformation includes presenting a visual depiction of the test result of the test.

18. The method of claim 3, wherein executing the instructions further causes the apparatus to:
receive a request to create or update the data transformation included in the first data flow between a first component of the first set and a second component of the first set, wherein the requested data transformation transforms data received from the first component to data received by the second component, and
create or update the data transformation included in the first data flow in response to the request.

19. The method of claim 3, wherein:
executing the instructions further causes the apparatus to:
receive a request to filter the visual depiction based on a filter criterion, and
identify, from the plurality of components, a set of resources that satisfy the filter criterion, and
presenting the visual depiction of the lineage of the record includes limiting the visual depiction to the set of resources.

20. The method of claim 3, wherein presenting the visual depiction of the lineage of the record includes presenting a visual depiction of a conflict between the first record and the second record.

21. The method of claim 3, wherein:
executing the instructions further causes the apparatus to detect a conflict based on a difference between the first record produced by the first data flow and the second record produced by the second data flow, and
presenting the visual depiction includes presenting a visual depiction of the conflict.

22. The method of claim 3, wherein executing the instructions further causes the apparatus to present, to a user, an alert indicating a conflict between the first data flow and the second data flow based on the query.

23. The method of claim 3, wherein:
executing the instructions further causes the apparatus to:
determine a change in the first set of the plurality of components or the first data flow of the query, and
determine a change in the first lineage of the first record based on the change in the first set of the plurality of components or the first data flow of the query, and
presenting the visual depiction of the first lineage of the first record includes presenting a visual depiction of the change in the first lineage of the first record.

24. The method of claim 23, wherein:
the change includes adding a component to the first set of the plurality of components, wherein the added component is included in the first data flow of the query,
determining the change in the first lineage of the first record based on the query includes determining the change in the first lineage of the first record based on the adding of the component in the first data flow, and
presenting the visual depiction of the change in the first lineage of the first record includes presenting a visual depiction in the change in the first lineage of the first record based on including the component in the first data flow.

25. The method of claim 23, wherein:
the change includes substituting a component for another component from the first set in the first data flow of the query,
determining the change in the first lineage of the first record includes determining the change in the first lineage of the first record based on the substituting of the component in the first data flow of the query, and
presenting the visual depiction of the change in the first lineage of the first record includes presenting a visual depiction in the change in the first lineage of the first record based on the substituting of the component in the first data flow.

26. The method of claim 23, wherein:
the change in the first set of the plurality of components or the first data flow of the query includes a change in a key performance indicator of the first data flow of the query indicated by the first lineage, and
presenting the visual depiction of the first lineage of the first record includes presenting a visual depiction of the change in the key performance indicator of the first data flow.

27. The method of claim 23, wherein executing the instructions further causes the apparatus to:
determine a reconciliation of the first data flow of the query between the plurality of components of the first set based on the change in the plurality of components or the first data flow, wherein the reconciliation resolves an identified data conflict, and
presenting the visual depiction of the first lineage of the first record includes presenting a visual depiction of the reconciliation of the first data flow of the query among the first set.

28. The method of claim 3, wherein each lineage is determined prior to generating a respective record in response to the query.

29. The method of claim 3, wherein each lineage is determined after generating a respective record in response to the query.

30. The method of claim 3, wherein each lineage is determined while generating a respective record in response to the query.

31. A system comprising:
memory hardware configured to store instructions; and processing circuitry configured to execute the instructions, wherein executing the instructions causes the processing circuitry to implement:
- a system map that identifies a plurality of components and a plurality of data flows of a query, wherein each data flow interconnects a set of the plurality of components and results in a record responsive to the query;
- a lineage determiner that determines, for each data flow based on the system map, a lineage of the record according to the data flow of the query through the set, wherein the lineage indicates the data flow among the set and a data transformation among the set that generates the record; and
- a lineage presenter that presents, to a user, a visual depiction of each lineage of the plurality of data flows for the query and the record corresponding to each lineage, wherein the visual depiction represents at least two data flows that result in different records for the same query.

* * * * *